US008317366B2

(12) United States Patent
Dalton et al.

(10) Patent No.: US 8,317,366 B2
(45) Date of Patent: Nov. 27, 2012

(54) LIGHT DISTRIBUTOR

(75) Inventors: David R. Dalton, Turramurra (AU); Patrick Michael Conrick, Bardwell Valley (AU); David John Alessio, Amherst, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 505 days.

(21) Appl. No.: 11/919,446

(22) PCT Filed: Apr. 28, 2006

(86) PCT No.: PCT/AU2006/000555
§ 371 (c)(1),
(2), (4) Date: Jun. 5, 2008

(87) PCT Pub. No.: WO2006/116799
PCT Pub. Date: Nov. 9, 2006

(65) Prior Publication Data
US 2009/0310350 A1    Dec. 17, 2009

(30) Foreign Application Priority Data
Apr. 29, 2005  (AU) .............................. 2005902181

(51) Int. Cl.
*F21V 7/00*    (2006.01)
(52) U.S. Cl. .................... 362/296.01; 362/614; 362/622
(58) Field of Classification Search .................. 362/235, 362/317, 296.01, 257, 614, 620, 621, 622
See application file for complete search history.

(56) References Cited

U.S. PATENT DOCUMENTS

| 5,339,225 | A |   | 8/1994 | Wiggerman |  |
|---|---|---|---|---|---|
| 5,584,556 | A | * | 12/1996 | Yokoyama et al. | 362/625 |
| 5,642,933 | A |   | 7/1997 | Hitora |  |
| 5,708,749 | A |   | 1/1998 | Kacheria |  |
| 5,743,634 | A | * | 4/1998 | Sitzema et al. | 362/341 |
| 6,024,463 | A | * | 2/2000 | Ishikawa et al. | 362/621 |
| 6,027,221 | A | * | 2/2000 | Ishikawa et al. | 362/619 |
| 6,186,645 | B1 |   | 2/2001 | Camarota |  |
| 6,205,691 | B1 | * | 3/2001 | Urda et al. | 40/559 |
| 6,259,854 | B1 | * | 7/2001 | Shinji et al. | 385/146 |
| 6,337,946 | B1 |   | 1/2002 | McGaffigan |  |
| 6,469,833 | B2 |   | 10/2002 | Eguchi |  |

(Continued)

FOREIGN PATENT DOCUMENTS

| DE | 10320485 A1 | 12/2004 |
| EP | 1180640 A1 | 2/2002 |
| FR | 2796126 A3 | 1/2001 |

(Continued)

OTHER PUBLICATIONS

Supplemental European Search Report (Art. 153(7) EPC) and European Search Opinion for Application No. 06721435.3-1268, filed Oct. 23, 2007, mailed Jul. 7, 2009, European Patent Office, Netherlands.

(Continued)

*Primary Examiner* — John A Ward
(74) *Attorney, Agent, or Firm* — Michael C. Pophal

(57) ABSTRACT

A light distributor includes a panel (202) having a textured surface (206) and a light distribution surface. A number of LEDs (204) are located in proximity to the textured surface. Some of the light (208, 212) impinging on the textured surface (206) is refracted or reflected (214, 216) into the panel (202) from where it can be transmitted through the distribution surface.

9 Claims, 19 Drawing Sheets

U.S. PATENT DOCUMENTS

| | | | |
|---|---|---|---|
| 6,520,655 B2 * | 2/2003 | Ohuchi | 362/612 |
| 6,808,281 B2 * | 10/2004 | Ho | 362/600 |
| 6,966,685 B2 * | 11/2005 | Li et al. | 362/616 |
| 7,011,442 B2 * | 3/2006 | Okuwaki et al. | 362/626 |
| 7,223,005 B2 * | 5/2007 | Lamb et al. | 362/615 |
| 7,497,611 B2 * | 3/2009 | Chen et al. | 362/622 |
| 7,604,388 B2 * | 10/2009 | Nishio et al. | 362/608 |
| 7,784,975 B2 * | 8/2010 | Krebs et al. | 362/296.01 |
| 2001/0048603 A1 | 12/2001 | Ohuchi | |
| 2004/0085762 A1 | 5/2004 | Iwasa et al. | |
| 2004/0105157 A1 | 6/2004 | Matsushita et al. | |
| 2004/0130911 A1 | 7/2004 | Chen | |

FOREIGN PATENT DOCUMENTS

| | | |
|---|---|---|
| JP | 04108806 U | 9/1992 |
| JP | 2004-176425 A | 6/2004 |
| WO | 0045086 A1 | 8/2000 |
| WO | 2005040676 A1 | 5/2005 |

OTHER PUBLICATIONS

Patent Cooperation Treaty (PCT), International Search Report and Written Opinion for Application No. PCT/AU2006/000555, filed Apr. 28, 2006, mailed Jul. 4, 2006, Australian Patent Office, Australia.

* cited by examiner

3302

LIGHT DISTRIBUTOR

FIELD OF THE INVENTION

This invention relates to a light distributor. In particular, the invention relates to a light distributor panel having a textured light collecting surface. The invention can be adapted for use with a lighting device in which the panel is illuminated by a light source. The device can be used as a light distributor for a flashlight or can be used as a light fixture.

BACKGROUND OF THE INVENTION

US20040179372 (Guerrieri) discloses a light stick in which a LED transmits light internally down a transparent rod. The outside of the rod has a plurality of grooves which disburse the light radially. The grooves in this device are on the opposite surface to the LED. This specification does not disclose the use of the grooves to capture light.

U.S. Pat. No. 5,006,971 (Jenkins) discloses an array of LEDs enclosed by, but spaced from, a cylindrical lens, the lens including a plurality of striations. The striations are used to disburse the light. The diodes are aligned to project light onto the lens at a high angle of incidence. This patent does not disclose the use of the striations to capture light.

U.S. Pat. No. 6,004,003 (Dalton et al), issued to the present applicant Eveready Battery Company, Inc., discloses a flashlight having a partially reflecting parabolic reflector which has a textured outer surface to disburse light which passes through the reflective surface. The textured surface is on the opposite side of the reflector to the light source. This patent does not disclose the use of the textured surface to collect light from the lamp.

Any reference herein to known prior art does not, unless the contrary indication appears, constitute an admission that such prior art is commonly known by those skilled in the art to which the invention relates, at the priority date of this application.

SUMMARY OF THE INVENTION

An embodiment of the invention provides a light distributor and a light source proximate to a first surface of the light distributor, wherein the first surface is at least partially textured.

Preferably the light source is a LED.
The LED can have a collimating lens.
The LED can be without a collimating lens.
A deflector can be associated with the LED. This can serve to deflect the light towards the first surface.
The deflector can be rotatable to attenuate the amount of light impinging on the first surface.
The light source can be located in relation to the first surface such that at least some of the light impinges on the first surface at an angle greater than the critical angle.
The first surface can be textured beyond the critical angle.
A reflector can be associated with the light source to reflect at least some of the light which does not impinge directly on the first surface onto the first surface.
The light source can be oriented in relation to the first surface so that a substantial part of the light falls directly on the first surface.
The angle between the light source and the first surface can be variable. This may be used to vary the light output.
The light distributor can be a substantially planar panel.
The first surface of the light distributor can be a curved surface.

The light distributor can be tubular.
The light distributor can be cylindrical.
Different patterns of texturing can be used at different regions on the first surface.
The light distributor can be transparent.
The light distributor can be translucent.
The first surface can be translucent.
The first surface can be translucent and the body of the distributor can be transparent.

"Textured surface" is used generally herein to include not only linear grooves but also random roughening, stippling and other texturing of the surface. Where it is intended to differentiate between different types of surfaces, terms such as "linear scoring" and "roughened" or other appropriate descriptors will be used expressly as the case requires.

The surface of the plate can be textured by scratching, etching or otherwise roughening the surface. In addition the application of a layer of material having a textured pattern can be used instead of etching or otherwise roughening the surface of the plate. Thus an adhesive layer of resin, plastics or similar material including particles having suitable optical properties adapted to reflect or refract light into the plate can be applied to a surface of a plate.

The plate can be of any suitable light transmissive material, such as glass or a plastics material. The plate can be matte white. The plate can be formed by particle moulding. The plate can be transparent or translucent. The texturing can be formed during a moulding process by selecting an appropriate mould surface or by the addition of a surface coating to part or all of the mould surface.

A lighting device according to an embodiment of the invention can include a light distributor, a reflector and a light source, wherein the light distributor includes a textured surface facing the reflector, and wherein the light distributor, the reflector and the light source are arranged so that at least part of the light from the light source which does not impinge directly on the textured surface is reflected by the reflector to impinge on the textured surface.

The distributor can be tubular.
The reflector can be positioned within the tubular distributor.
The reflector can be in the form of a hollow body adapted to contain one or more power sources.

A lighting device according to an embodiment of the invention can include two or more light sources, wherein the distributor has a first and second opposite ends, there being an interstice between the reflector and the distributor, and wherein at least one first light source is positioned near the first opposite ends and oriented to transmit light into the interstice between the reflector and the distributor, and at least a second light source is positioned near the second opposite end and oriented to transmit light into the interstice between the reflector and the distributor.

The interstice can be an air gap.
The interstice can be at least partially filled with a translucent or transparent material.

According to a further embodiment of the invention, a lighting device can include a light distributor, a power source enclosure, and a light source, wherein the light distributor can include a textured surface, and wherein the light distributor and the light source can be arranged so that at least part of the light from the light source impinges directly on the textured surface, the distributor being at least partially hollow and containing the enclosure.

The lighting device can include a refractive index deflector to direct light from the light source towards the textured surface.

The deflector can be conical.

The inner surface of the tubular light distributor can be textured, and one or more light sources can be arranged to transmit light to impinge on the textured surface.

A further embodiment of the invention provides an area light including a tubular light distributor member, wherein the outer surface of the tubular light distributor is textured, and one or more light sources are arranged to transmit light to impinge on the textured surface.

A further embodiment of the invention provides a lighting device including an area light and a directional light, wherein the area light includes a light distributor having a textured light distributor adapted to capture at least part of the light from a light source and to radiate the captured light.

The directional light can be adapted to be swiveled.

The outer surface of the light distributor can be textured and one or more light sources can be arranged to transmit light to impinge on the textured surface, the flashlight including a reflector located within the tubular light distributor and adapted to reflect light in a preferred direction.

The reflector can be adapted to reflected a portion of the light in a substantially axial direction in relation to the tubular light distributor.

A further embodiment of the invention provides a combined area light and flashlight, including a tubular light distributor and a reflector, wherein the reflector and tubular light distributor are mutually slidable to permit the reflector to enter the tubular light distributor when the device is used as a flashlight, and wherein the reflector can be at least partially withdrawn from the tubular light distributor when the device is used as an area light.

A further embodiment of the invention provides a flashlight including a light source having a first directional beam, the flashlight including a beam forming lens arranged to form a second directional beam from the directional beam.

The term "critical angle" is used to refer to the nominal critical angle which would apply if the first surface were smooth. It is postulated that the roughening of the surface enables light which impinges at an angle greater then the critical angle to be captured by being reflected or diffracted into the light distributor. Critical angle is measured between the beam angle and the normal to the surface.

BRIEF DESCRIPTION OF THE DRAWINGS

An embodiment or embodiments of the present invention will now be described, by way of example only, with reference to the accompanying drawings, in which.

DETAILED DESCRIPTION OF THE EMBODIMENTS

This invention derives from observations by the inventor that, where a light source was placed in proximity to a planar or other surface of a transparent or translucent body and the surface was scratched, grooved, patterned or textured, the plate appeared to emit brighter illumination than when the surface was smooth.

The reasons for the performance of the light distributors embodying the invention have not been fully analysed. However, one possible explanation for some of the features may be explained in terms of the capture of light which impinges on a surface beyond the critical angle. In other words, light at grazing angles of incidence, or at least at angles of incidence greater than the critical angle is not entirely reflected away from the plate, but is at least captured by the surface irregularities and refracted into the plate. The applicant does not assert that this is the sole mechanism or even a major mechanism for the observed phenomenon, but it is set out herein as a working hypothesis.

A second possible mechanism for the apparent brightness is that the light is scattered by the texturing so that more light may be directed outwardly of the plate (i.e., with a component of light directed more towards the normal to the surface of the plate rather than being transmitted substantially parallel to the plane of the plate or emerging in a ray path parallel with the path by which the ray entered the plate. In the case of a plain plate, when the light is not scattered, it passes out parallel to the particular rays from which it originated so the light is of fairly uniform brightness, but is distributed uniformly. Light which passes through a textured surface is scattered and less will pass through which is oriented parallel to the major axis of the light source. It is postulated that the use of the textured surface captures light with surfaces which tend to deflect the rays at an angle having a component more normal to the surface, effectively increasing the amount of light emerging normal to the panel rather than parallel to the panel. Thus more light will be emitted oriented at least partially normal to the surface (compare, for example FIGS. 2 & 3). Again, this is a possible hypothesis rather than a proven theory.

The following factors have been observed to influence the brightness of light emitted from the panel:
the type of texturing (grooves, surface roughening, etc.);
orientation or alignment of grooves;
spacing of grooves or surface irregularities;
size of the texturing (width, depth, length).

Figure 1:
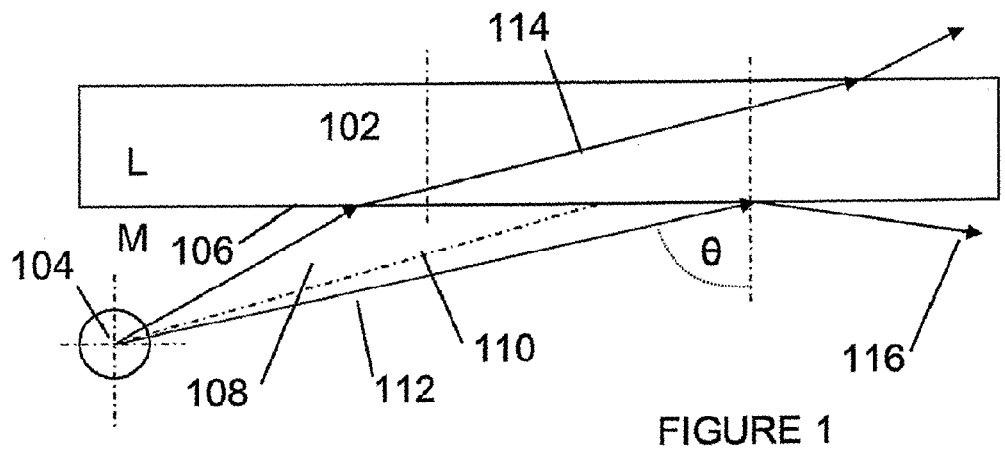
FIG. 1 illustrates a light source adjacent to a smooth surface.

FIG. 1 shows a planar block of transparent material 102 and a light source 104 located in proximity to a first surface 106 of the block 102.

Light rays 108, 112 are shown impinging on the surface 106 on either side of the critical angle line 110. The ray 108 which strikes the surface 106 at an angle less than the critical angle enters the block and is diffracted as shown at 114. The ray 112 which strikes the surface 106 at an angle greater than the critical angle is reflected as shown at 116. A ray (not shown) which strikes the surface at the critical angle would be deflected along the surface 106. The angle of incidence θ and the critical angle are measured by reference to the vertical to the surface 106.

The letters "M" and "L" are shown on the diagram by way of example only to indicate a difference in refractive index (RI) between the RI (M) of the medium outside the block and the RI (L) of the block. In this example L indicates lower RI, and M indicates higher RI. It is also within the scope of the invention that the block have a higher RI than the medium.

Figure 2:
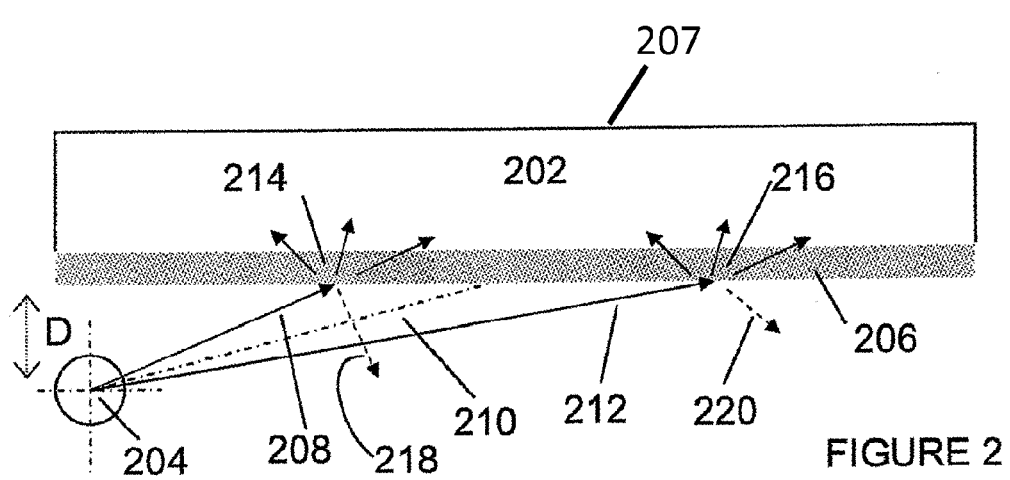
FIG. 2 illustrates a light source adjacent to a textured surface.

The inventor observed that, in the arrangement of FIG. 1, light emerging from the opposite side of the plate 102 from the light source 104 did not appear as bright as the light from the arrangement of FIG. 2.

FIG. 2 shows a block of transparent or translucent material 202 with a textured surface 206 and an associated light source 204. The beam 208 which strikes the surface 206 at less than the critical angle is scattered by the textured surface and some of the light 214 enters the block 202 and is distributed by second surface 207 while some of the light 218 may be reflected away from the block.

In FIG. 2, the texturing is shown as being of a finely spaced roughening of the surface 206.

In this example, the light source has been considered as a point source located at a distance "D" from the textured surface 206. The minimum limit for D can correspond with the outer housing of the light source. In practice, the light source can have one or more dimensions which can also influence the performance of the light distributor.

Figure 3:
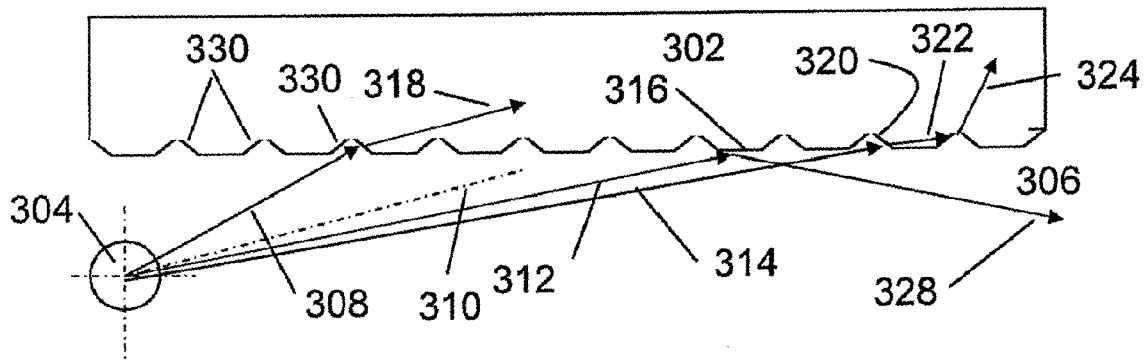
FIG. 3 illustrates another embodiment of a textured light diffuser.

In FIG. 3, the texturing is of a less dense type and is assumed to represent spaced apart scratches or grooves 330 shown in cross section. In this embodiment, the grooves are spaced apart and present substantially flat surfaces 316 while the walls of the grooves present sloping faces 320 to the incoming light from light source 304. A ray 308 below the critical angle 310 will be absorbed whether it strikes the sloped surface 320 or the flat surface 316. A ray 312 which strikes the flat surface 316 beyond the critical angle will be reflected at 328, while a ray 314 which strikes the sloping face 320 will be absorbed 322 into the block 302 even though the ray has a larger angle of incidence than ray 314.

In the arrangement of FIG. 3, with the grooves substantially transverse to the axis of the light, the "near" wall 330 of the groove may receive little or no light from the light source, or the angle of incidence may be too great for such light as falls on this wall to be refracted into the block 302. However, in the configuration of FIG. 3, most of the light will fall on the flat portions and the walls 320.

If, instead of being transverse to the light axis, the groove were to be substantially parallel to the light axis, light would fall on either wall of the grooves.

Where the texturing consists of grooves, the nature of the surface of the walls of the grooves can influence the amount of light captured by the grooves. A smooth groove parallel to the light ray may not capture light beyond the critical angle, whereas a groove with roughened side walls may capture light beyond the critical angle.

Figure 4:
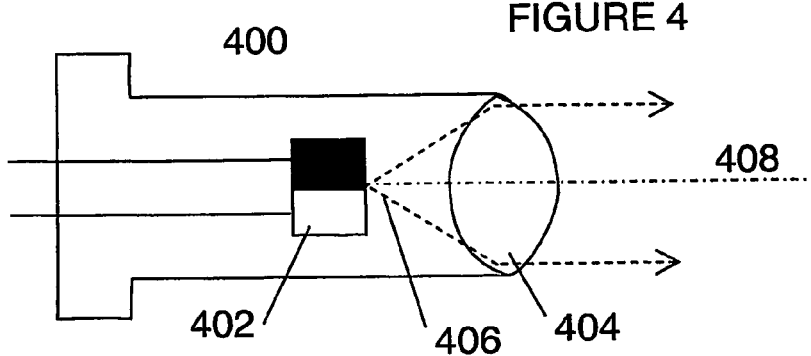
FIG. 4 illustrates a light emitting diode (LED)

FIG. 4 illustrates a light emitting diode 402. Such diodes basically work by emitting light from a junction between "p" and "n" doped semiconductor material. The light is usually emitted in a conic or triangular section pattern 406. A lens 404 can be provided to focus the light into a narrower beam, a parallel beam, or a converging beam. In FIG. 4, the beam is illustrated as being collimated into a beam parallel to the light axis 408.

Figure 5:
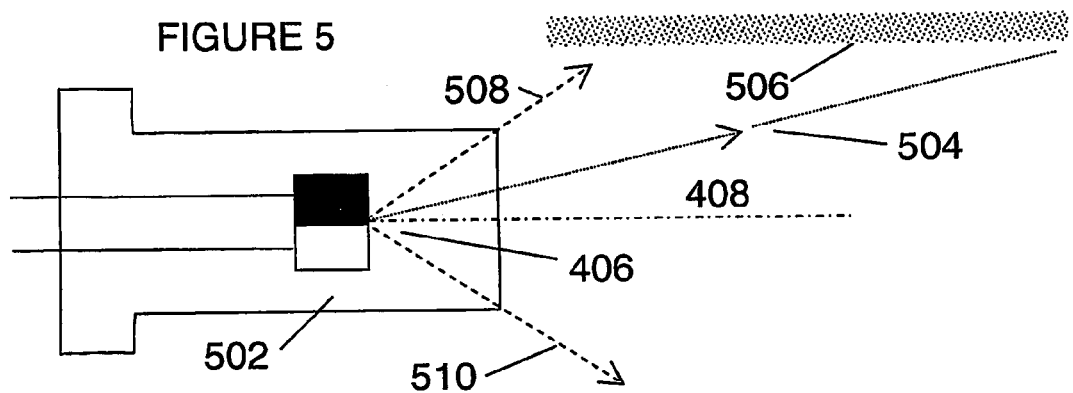
FIG. 5 illustrates a LED without collimating lens.

FIG. 5 shows a diode 502 from which the lens has been removed so that the radiation pattern of the light is a conical beam. This diode 502 is shown adjacent to a textured surface 506. The axis of the diode beam is shown as parallel to the surface 506. The diode is arranged so that light between the ray 508 and the ray 504 fall on the surface 506, while the rest of the light between rays 504 and 510 does not impinge on the surface. A reflector (not shown) can be provided to cause the light between rays 504 and 510 to be reflected back towards the surface 506.

An LED is a more directional source than an incandescent bulb.

Figure 6:
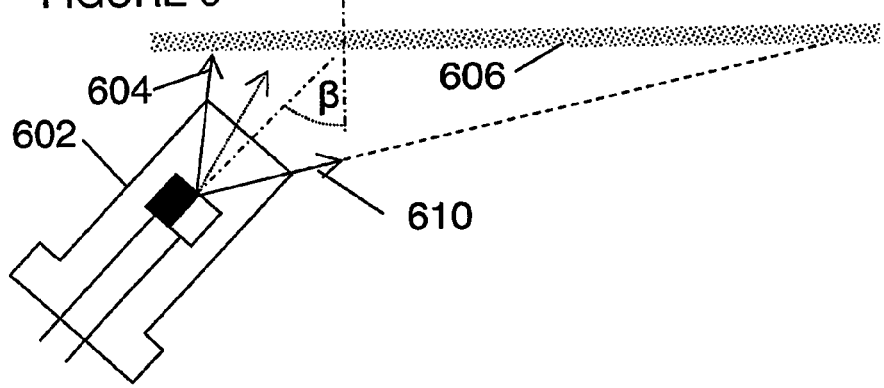
FIG. 6 shows a LED associated with a textured surface.

In FIG. 6, the orientation of the diode 602 in relation to the surface 606 has been changed so that the rays 604 and 610 defining the light cone from the diode impinge directly on the surface 606. This ensures that the majority of the light from diode 602 impinges on the surface 606.

In a variation of this arrangement, the diode 602 can be rotatable relative to the surface 606 to change the angle of the axis with resect to the surface 606 so as to modulate the amount of light from the diode 602 which impinges on the surface 606, providing a means for controlling the brightness of the light from the light distributor.

Figure 7:
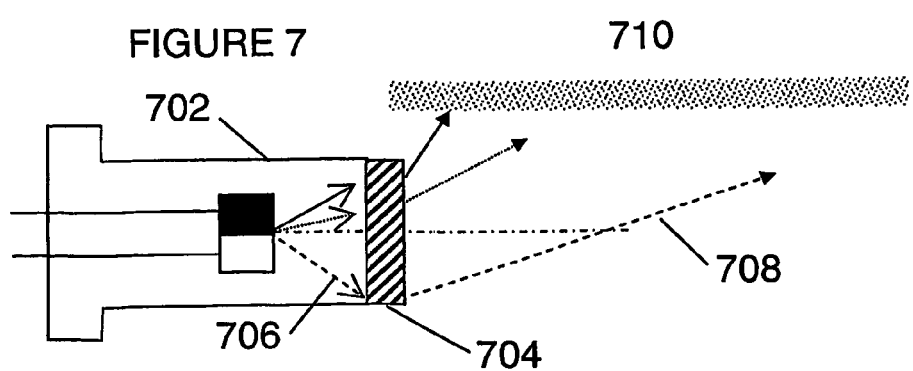
FIG. 7 shows a LED with a diffraction grating.

FIG. 7 shows an embodiment in which a diffraction grating 704 is used to diffract the light from the diode 702 onto the surface 706. A prism may also be used instead of the grating.

As seen in FIGS. 2 to 7, the light source can produce a light beam having a beam axis. The beam axis can be oriented approximately parallel to the textured surface or it can be inclined to the surface. Some light may be captured when the diverging angle between the beam axis and the textured surface is such that the outer ray of the beam strikes the textured surface. This is defined by the tan of the divergent angle being less than D/L, where L is the length of the distributor in the axial direction. FIGS. 6 & 7 show the axis convergent with the textured surface. The angle of convergence can be less than 45°. The angle of convergence can be within the range of 0° to 20°.

Figure 8:
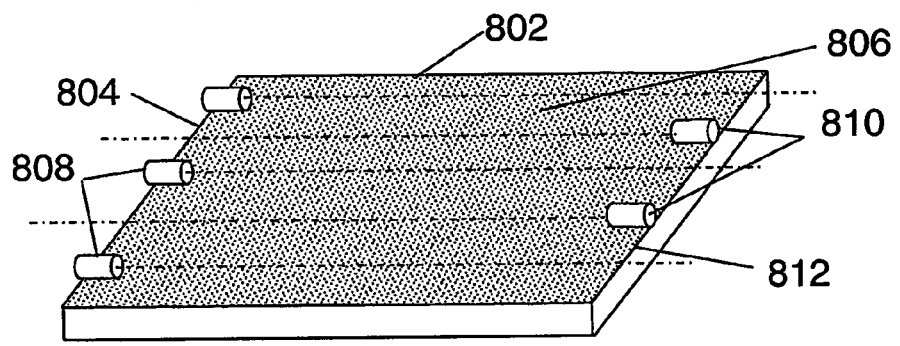
FIG. 8 shows a flat panel and associated light sources.

FIG. 8 shows a flat plate 802 with a textured surface 806. One or more light sources 808 are arranged along edge 804 and one or more light sources are arranged along the edge 812. The alignment of the light sources can be alternated as shown to provide a more uniform illumination of the panel. However, it is not essential that the alignment be staggered, and opposed LEDs can be used.

Figure 24A:
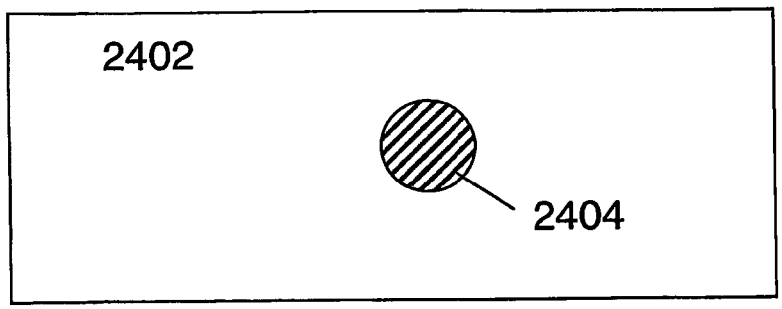
FIGS. 24 A & B show plan and end views of the light distribution using a perpendicularly oriented or "high angle" LED in a flat assembly.
Figure 24B:
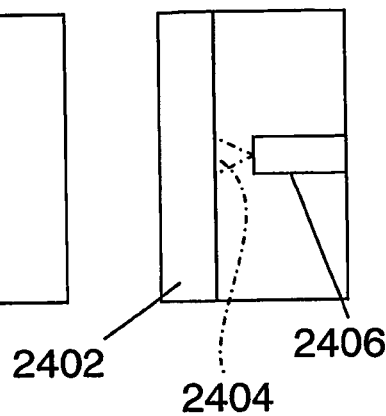

One effect of the arrangement shown in FIG. 8 is that it permits a flat arrangement with good light distribution in comparison with an arrangement in which the light axis of the LED is perpendicular to the panel, as shown in FIGS. 24 A & B, 25 A & B, & 25 A & B. FIGS. 24 A & B show a LED 2406 perpendicular to the panel 2402 and at a small distance therefrom to provide a flat assembly. The consequent light spot 2404 is a very bright spot with a very constricted diameter as the light is not well distributed because of the proximity of the LED to the panel 2402.

Figure 25A:
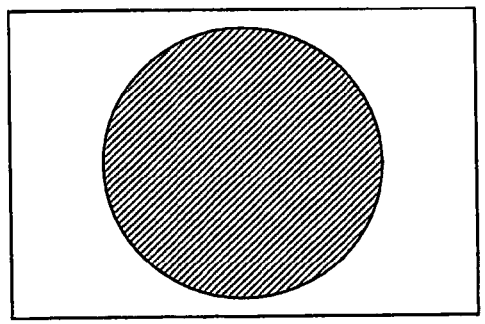
FIGS. 25 A & B show plan and end views of the light distribution using a perpendicularly oriented LED in an assembly having significant depth.
Figure 25B:
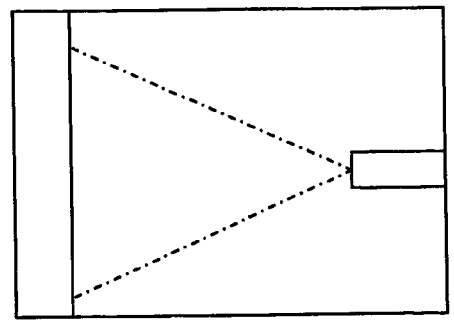

FIGS. 25 A & B show the LED with perpendicular orientation located at a distance where the light is more evenly distributed. However, this is not a flat assembly because the LED must be located at a significant distance from the panel.

Figure 26A:
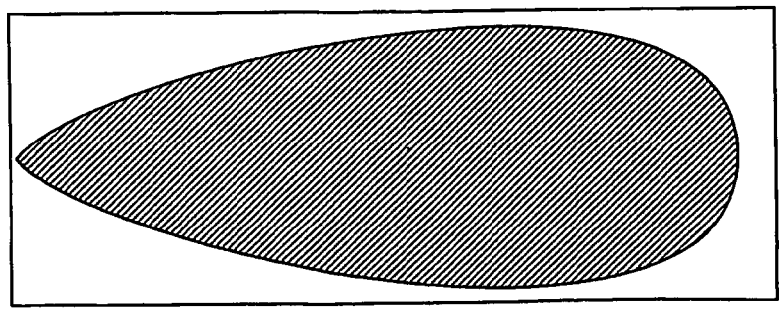
FIGS. 26 A & B show plan and end views of the light distribution using a low angled LED in a flat assembly.
Figure 26B:
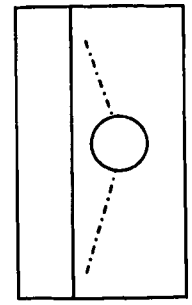

FIGS. 26 A & B show a LED aligned as in FIG. 8. The light is spread over a large area of the panel to provide a more even spread of illumination with a flat assembly.

Figure 35:
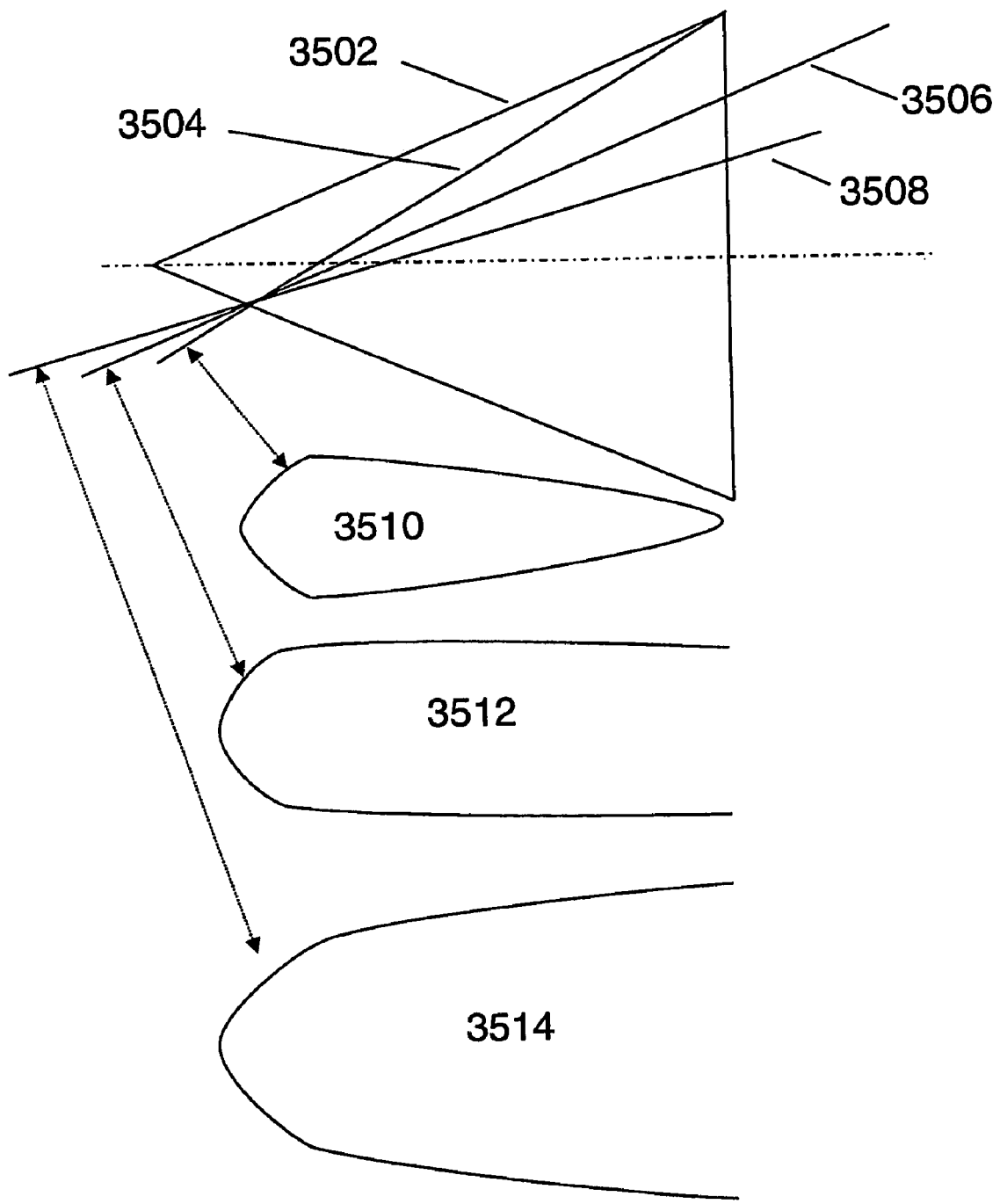
FIG. 35 shows the effect of varying the plane of intersection of a distributor with a conical light beam.

FIG. 35 is a schematic illustration showing the effect of varying the angle of intersection of a plane with a conical beam 3502. A first plane perpendicular to the plane of the page and represented by line 3504 is angled to intersect the upper side of the beam 3502. The radiation pattern is consequently convergent as shown illustratively at 3510.

A second plane, represented by line 3506 is parallel to the upper side of the beam 3502. As a result, plane 3506 does not intersect the upper side of the beam. This plane will result in an illumination pattern which has approximately parallel sides and is open ended, similar to that illustrated at 3512.

A third plane 3508 is divergent in relation to the upper edge of the beam 3502, so that it does not intersect the upper edge of the beam to the right of the apex of the beam. An illustrative illumination pattern on plane 3508 is shown at 3514 as diverging and open ended.

The LED can be placed at various perpendicular distances above the planes 3504, 3506, 3508 to alter the illumination pattern. The illumination pattern is also influenced by the orientation of the beam angle to the plane. Thus, by selecting the relative location of the diode and the light distributor, and the orientation of the beam with respect to the distributor, the illumination pattern can be selected to suit particular applications.

Figure 9:
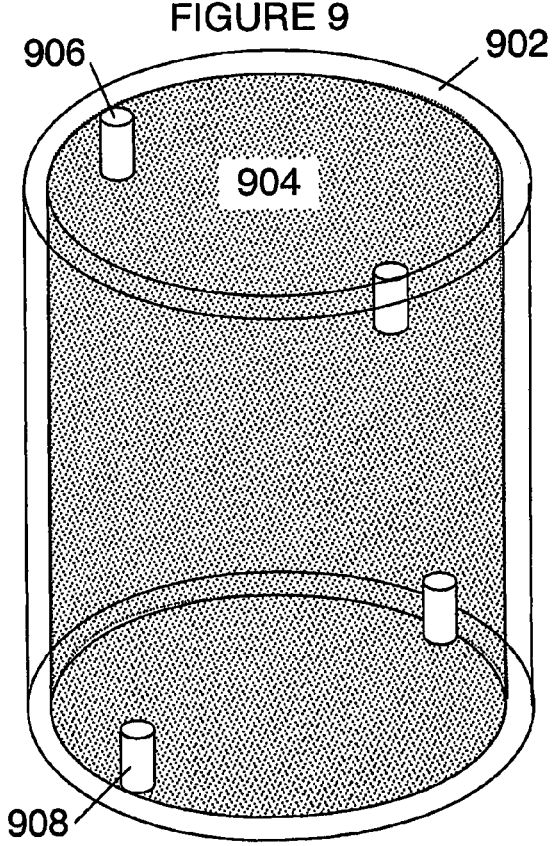
FIG. 9 shows a cylindrical luminaire and associated light sources.

FIG. 9 shows a tubular light distributor 902 with light sources 906 and 908 around either inner rim. The inner surface is textured.

Figure 10:
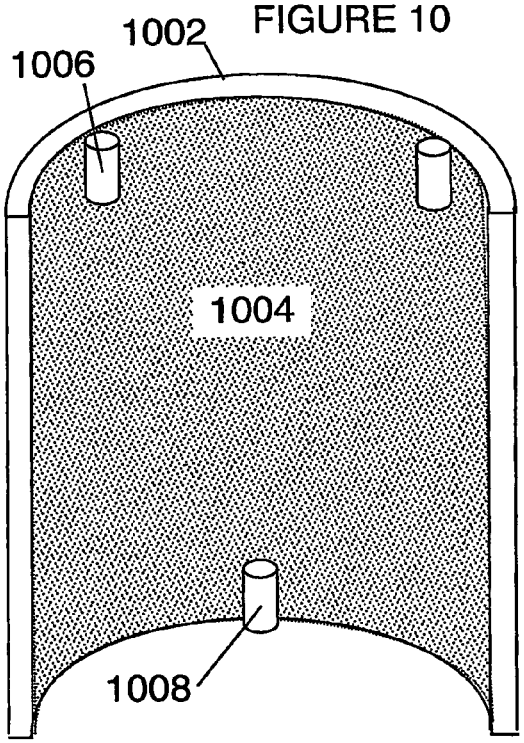
FIG. 10 shows a curved luminaire.

FIG. 10 shows a curved light distributor 1002 with a textured surface 1004 and light sources 1006, 1008 arranged to project light substantially in the direction of linear axis of the distributor.

Figure 11:
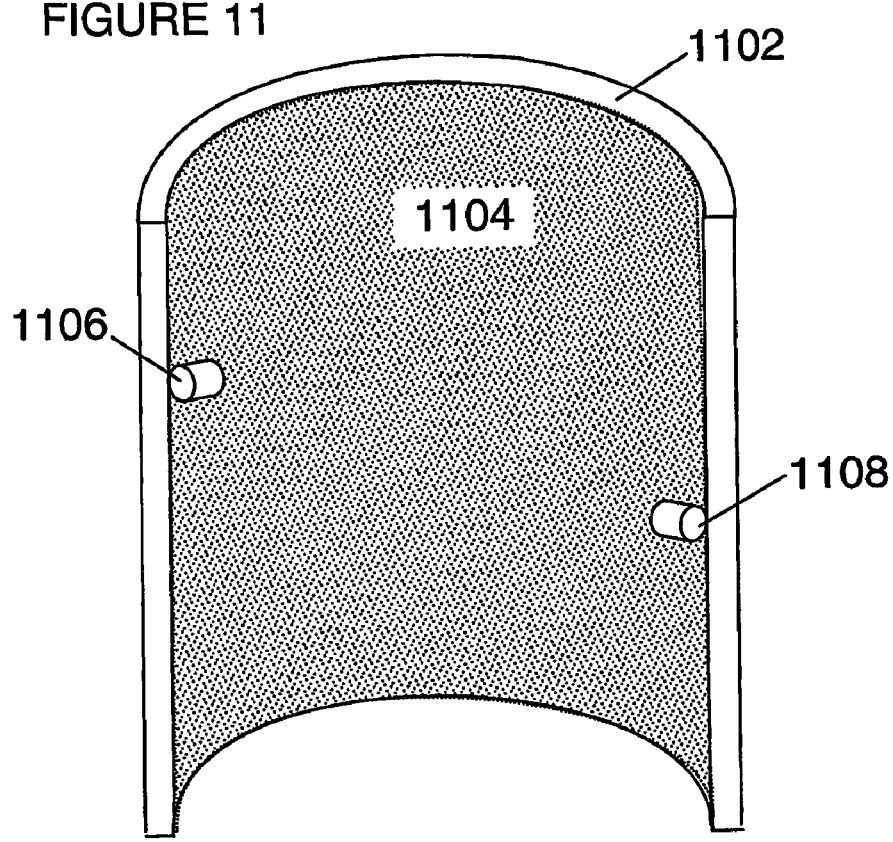
FIG. 11 shows an alternative curved luminaire and associated light sources.

FIG. 11 shows a distributor similar to that of FIG. 10, but wherein the light sources transmit light substantially transversely of the direction of transmission shown in FIG. 10.

Figure 12:
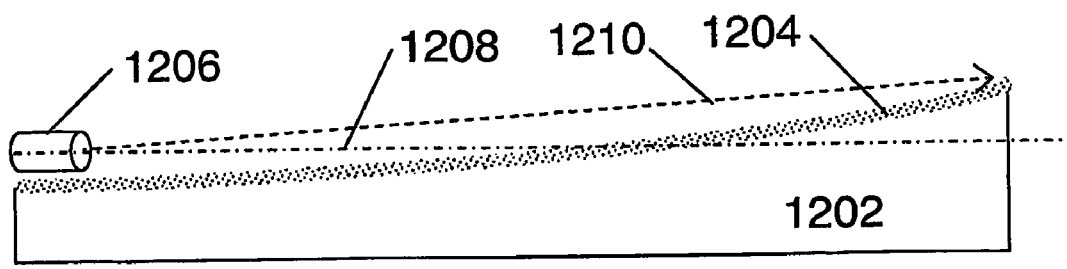
FIG. 12 shows a flat panel with a curved textured surface.

FIG. 12 shows a light distributor 1202 having an angled or curved textured surface 1206. The rise of the textured surface can be designed to capture a substantial part of the light transmitted by light source 1204.

Figure 13:
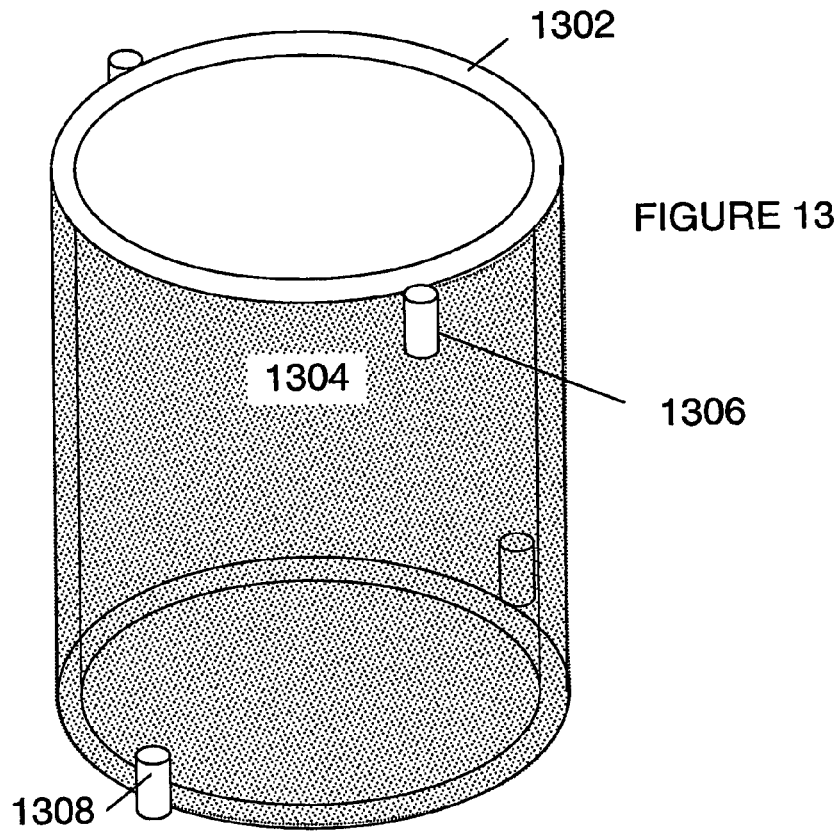
FIG. 13 shows a tubular light distributor with the light sources and textured surface on the external surface.

FIG. 13 shows a tubular light distributor 1302 in which the textured surface 1304 and associated light sources 1306, 1308 are on the outer surface. In this arrangement light can be initially transmitted to the inside of the tube and re-radiated back through the sides and/or ends of the tube.

Figure 14:
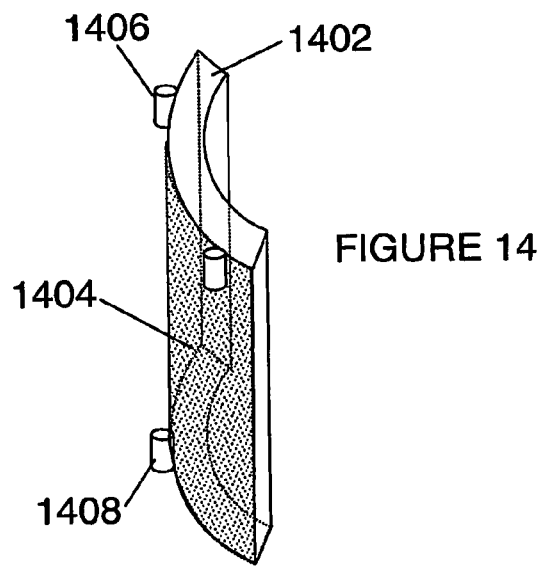
FIG. 14 shows A curved plate light distributor with the textured surface and light sources on the convex surface.

FIG. 14 shows an arcuate light distributor 1402 with the textured surface 1404 and light sources 1406, 1408 on the convex surface.

Figure 15:
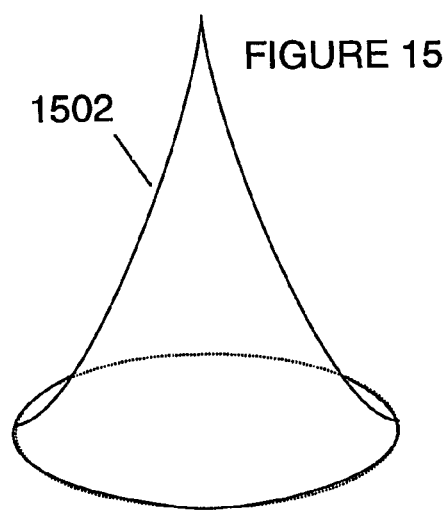
FIG. 15 shows a reflector adapted for insertion into a light distributor such as that of FIG. 13.

FIG. 15 shows a reflector 1502 adapted for insertion into a tube such as that of FIG. 13. The reflector can have a substantially conic section profile, or a surface of revolution defined by a suitable curve to produce a desired beam shape. The axis of the reflector can be coincident with the axis of the tube 1302. The profile of the reflector can be designed to produce a beam which includes a proportion of light parallel to the axis of the tube. The reflector 1502 can have a rounded apex instead of a pointed apex.

The reflector 1502 can be arranged to slide into the distributor 1302 to produce a flashlight beam, or can be slid out of the distributor 1302 to produce an area light. This arrangement is illustrated with reference to FIGS. 16 & 17.

Figure 16:
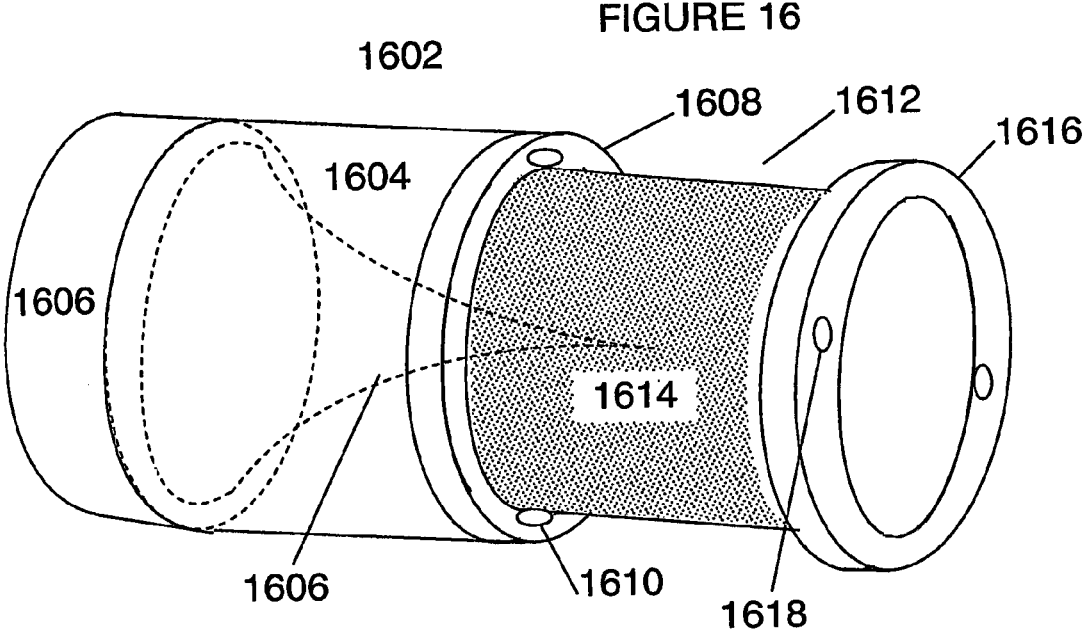
FIG. 16 shows a first view of a two function lamp embodying the invention.
Figure 17:
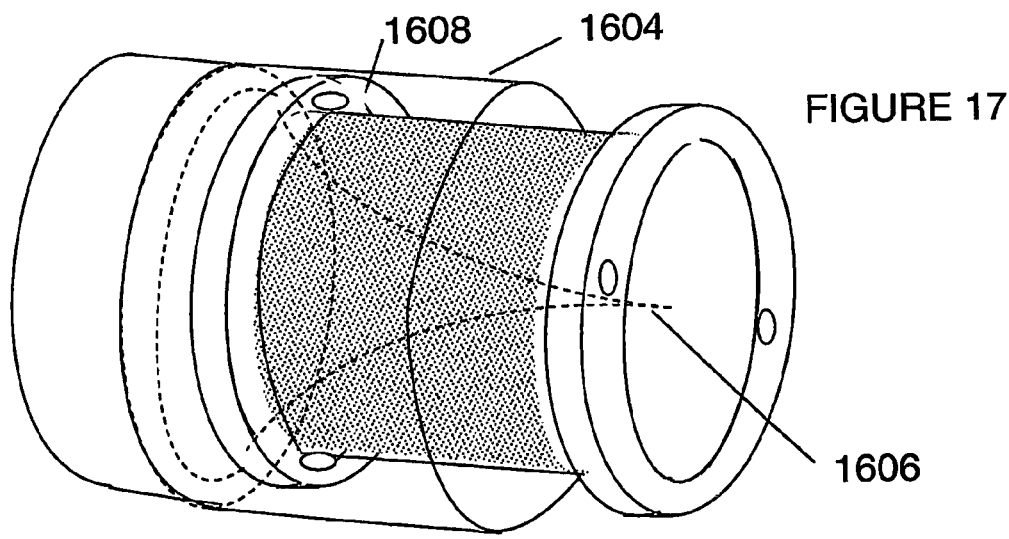
FIG. 17 shows a second view of the lamp of FIG. 16 in its flashlight mode.

In FIG. 16, a two purpose light 1602 is shown having a body 1604 with a base 1606 which can contain batteries, accumulators or the like to power the LEDs 1610, 1618. A reflector 1606 is mounted in the base and is adapted to fit within the tubular light diffuser 1612 which has its outer surface 1614 textured. The tubular diffuser 1612 has a first annular rim 1608 at the end adjacent to the housing 1604 and this rim is adapted to slide into the housing 1604 as shown in FIG. 17. In an alternative embodiment, the diffuser can be adapted to slide outside the housing 1604.

The annular rim 1608 and annular rim 1616 carry LEDs 1610 and 1618. These LEDs can be oriented so that the majority of the light they emit falls on the textured surface 1614 of the tubular diffuser 1612. A transparent or translucent cover (not shown) mounted between rims 1608, 1616 can be used to enclose the textured surface 1614 and LEDs 1610, 1618.

When the diffuser 1612 is in its extended position, it acts as an area lamp as discussed above. In this configuration, at least part of the light which strikes the reflector can be reflected outwards in a generally radial direction to augment the area light effect.

When the diffuser is retracted into the housing, the reflector 1606 is within the diffuser 1612 and thus light entering the tube cavity is reflected forward (, i.e., towards the apex of the reflector) so the device 1602 acts as a flashlight.

The housing 1604 can be transparent or translucent so that, when the diffuser 1612 is in an intermediate position, light can also be diffused through the housing 1604. Alternatively, the housing 1604 can be reflective to return light to the diffuser, or the housing 1604 can be opaque.

Even when the device is in the flashlight mode, a certain amount of light can still be emitted via the textured surface. This may be useful in case the flashlight is dropped and the major light axis is obscured.

Figure 18:
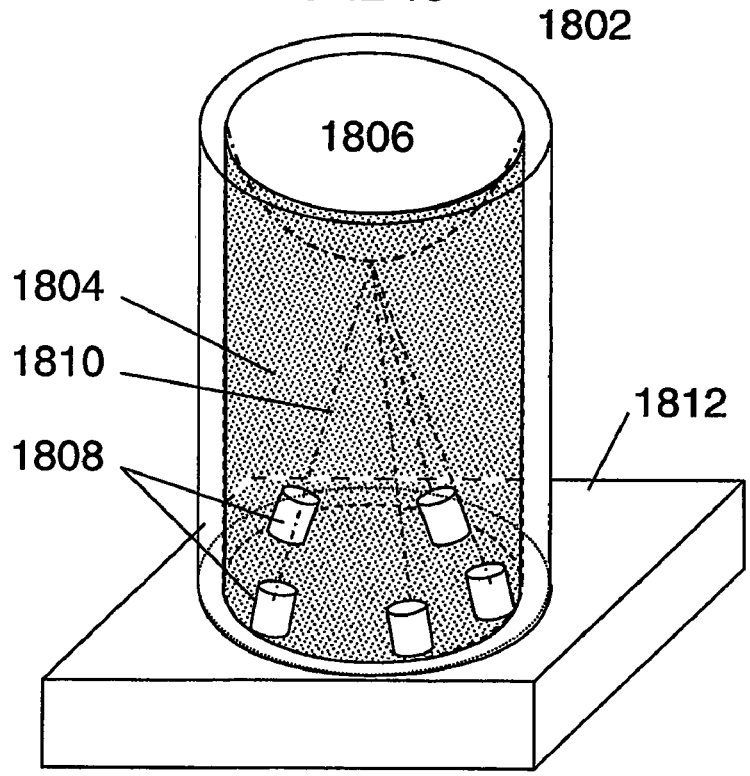
FIG. 18 shows a cylinder lamp including a light collector embodying the invention.

Suitable electrical connections and switch (not shown) are provided. The connections can be flexible leads. Transparent conductors can also be used on the smooth surface of the diffuser FIG. 18 shows a cylinder lamp 1802 having a textured internal wall 1804, and being closed at one end by a reflector 1806. The cylinder stands on a box 1812 and LEDs 1808 are arranged inside the lower part of the cylinder. The reflector 1806 is arranged to reflect light from the LEDs 1808 back towards the textured wall 1804. The reflector 1806 can be a part spherical mirror, and can, for example, be convex, as shown, or concave, or any other shape suitable to reflect the light back to the surface 1804. The LEDs 1808 can be arranged so that their light axes 1810 impinge on the centre of the reflector 1806. The height of the cylinder and the profile of the reflector 1806 can be adjusted to produce specific optical effects.

Figure 19:
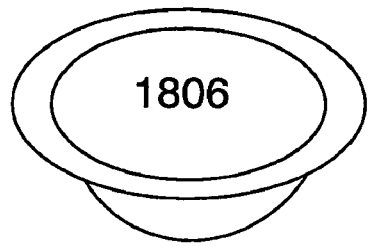
FIG. 19 shows a reflector adapted for use with the lamp of FIG. 18.

FIG. 19 shows a convex reflector suitable for use with the lamp of FIG. 18.

Figure 20A:
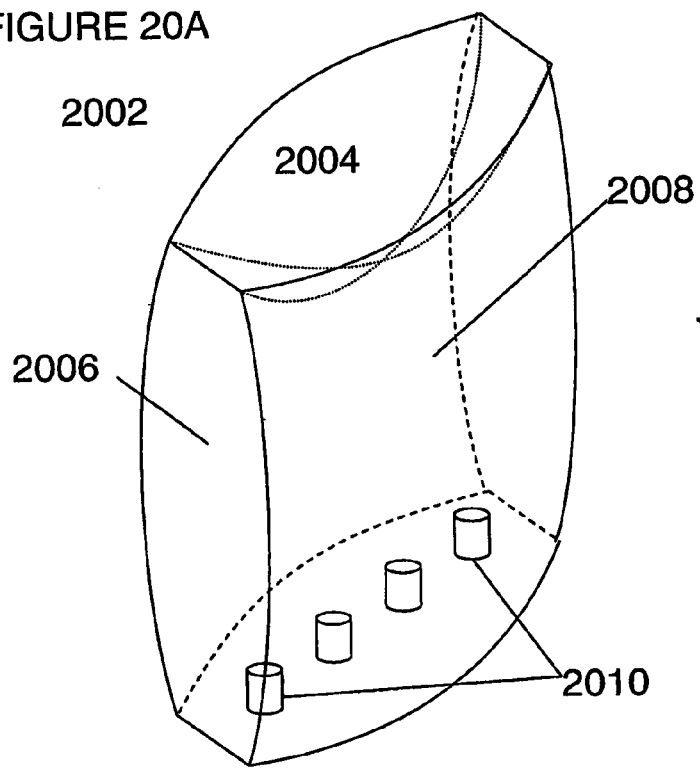
FIGS. 20 A, B, & C show a box lamp embodying the invention with section views of the reflector.

FIG. 20 shows a box shaped lamp 2002 with convex sides 2006, 2008 the corresponding "hidden" upright walls can also be convex. LEDs 2010 are arranged along the bottom of the box and can be arranged so their light axes impinge on a reflector surface 2004 at the top of the box. The inner surfaces to the upright walls are textured, but the texturing is not shown in the drawing to improve the clarity of the drawing. The reflector 2004 is adapted to reflect the light back to the inner surfaces of the textured upright walls which capture the light.

Figure 20B:
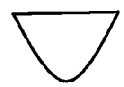
Figure 20C:
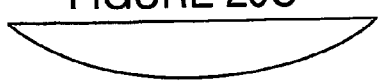

FIG. 20B is a transverse section through the reflector surface 2004, and FIG. 20C is a longitudinal section through the reflector 2004.

Figure 21:
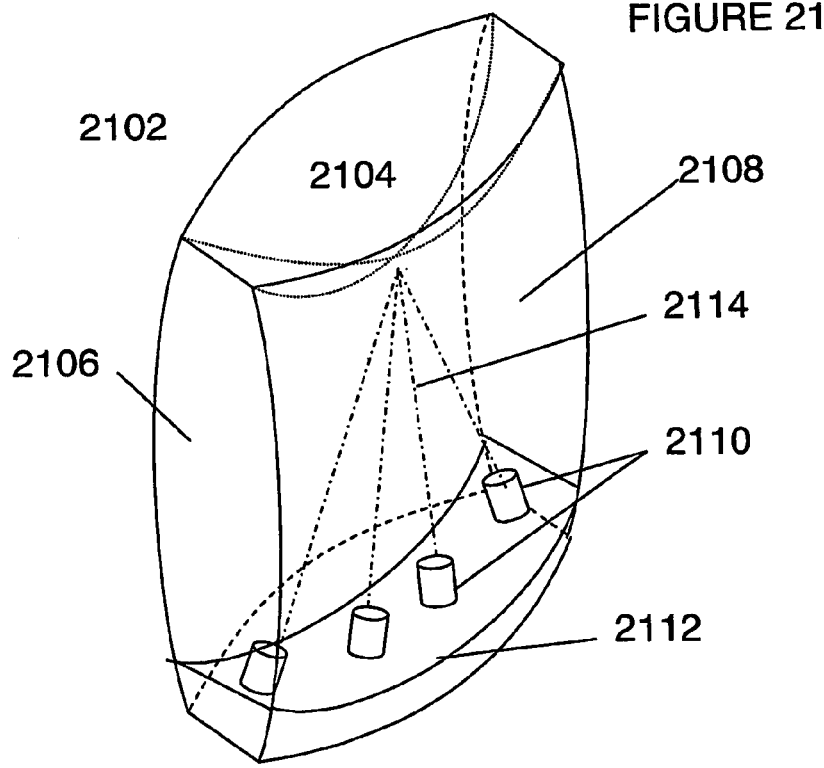
FIG. 21 shows a modified version of the lamp of FIG. 20.

FIG. 21 is a variation of the lamp of FIG. 20 in which the bottom floor 2112 is curved to orient the LEDs 2110 so that their light axes 2114 impinge on the centre of the reflector 2004.

Figure 22:
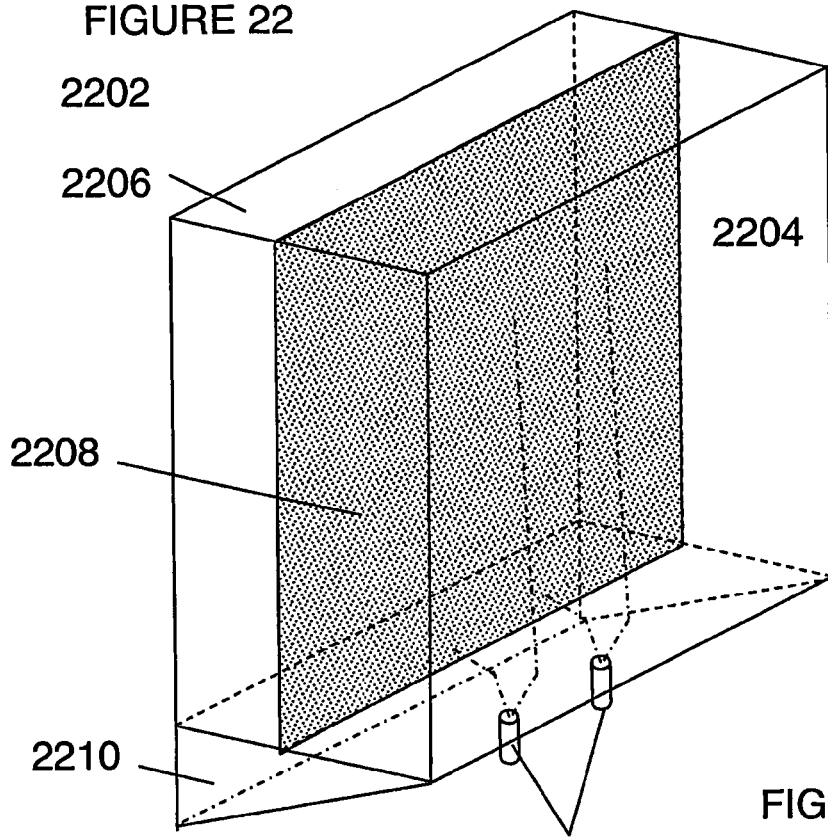
FIG. 22 shows a flat panel lamp embodying the invention.

FIG. 22 shows a flat panel lamp having a textured light capture surface 2208 sandwiched between panels 2204 and 2206. A prismatic input 2210 deflects the light from the LEDs 2212 towards the textured surface 2208. The patterning can be formed by pyramidal or tetrahedral projections or depressions as the internal pattern. The pattern can be formed on one plate and mating ridges formed on the other plate. This can be done by forming the pattern on a first of the plates and moulding the second plate onto the first plate. The surface of the ridges or grooves can be roughened.

Figure 23:
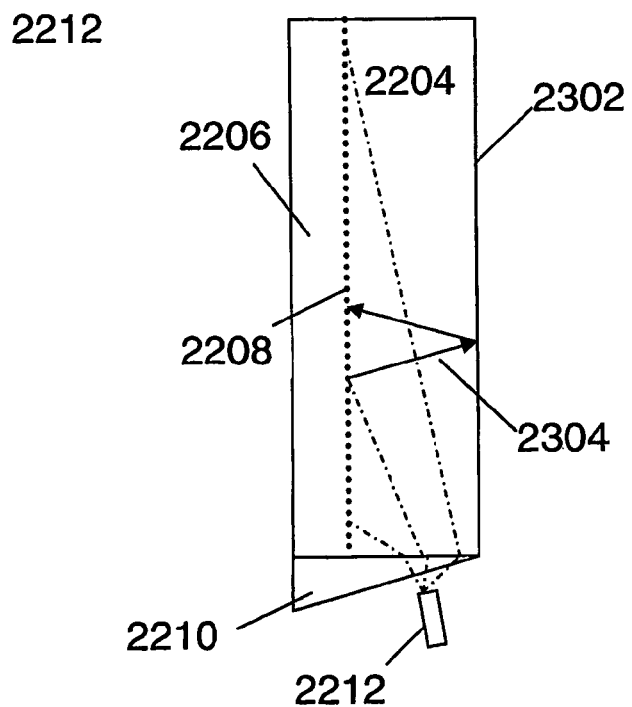
FIG. 23 shows a side view of the lamp of FIG. 22.

FIG. 23 is a side elevation of the lamp of FIG. 22 showing the deflection of the light cone from the LED 2212. The wall 2302 of panel 2204 can be reflective to capture back-scattered light 2304 and reflect it back to the wall 2208.

Figure 27:
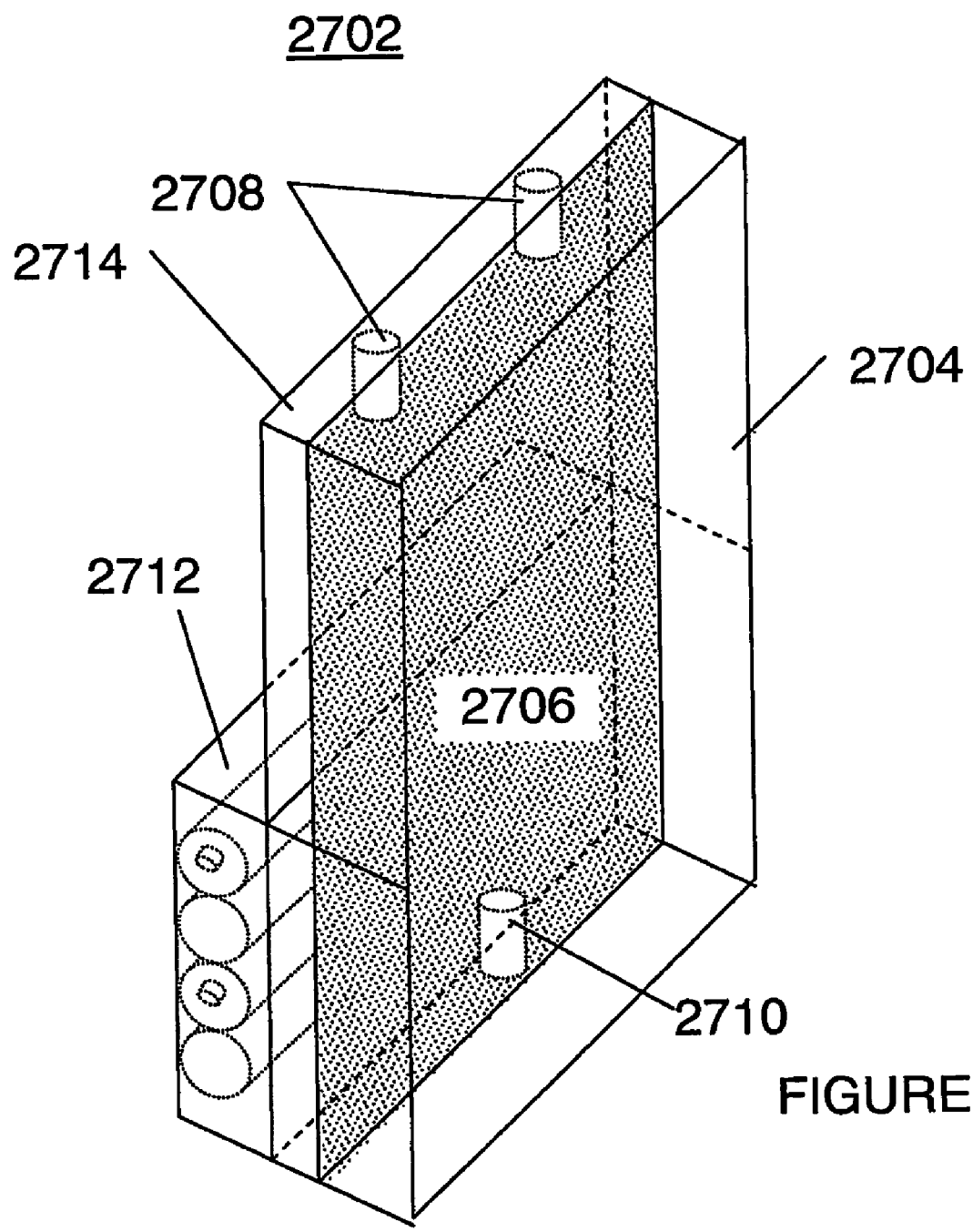
FIG. 27 shows a flat panel battery operated light.

FIG. 27 illustrates a flat panel flashlight 2702 having a panel 2704 with textured face 2706 and LEDs 2708, 2710. A battery compartment 2712 can contain one or more batteries or high capacity accumulators. A housing 2714 covers the diode side of the panel 2704.

The electrical connections and switches are not shown in the figures.

The light sources can be diodes. The diodes can be white light diodes.

The type of texturing can be varied according to the angle of incidence of the light to control the intensity of light emitted from the light distributor. Thus a pattern of grooves may be used in which the spacing of the grooves reduces as the distance from the light source increases. Alternatively, the orientation of the grooves may change from a more parallel orientation relative to the light axis to a more transverse orientation as the distance between the grooves and the light source increases. The pitch or distance between grooves can decrease as the distance from the light source increases. Mixtures of different forms of texturing, such as grooves and roughening can also be used. Other variations of the texturing are also within the inventive concept. Thus, for example, a pattern can be used to provide a more uniform spread of light from the light distributor. Conversely, a pattern may be used which produces lighter and "darker" regions.

Transparent electrodes can be applied to the un-textured surface to conduct power to one or more of the LEDs.

While the distribution surface is shown as parallel to the textured face in several of the embodiments, it is not essential that this be the case. Where the distribution surface is not parallel with the textured face, a prismatic effect can be achieved in which the overall direction of the emitted light is altered by the prism. However, where a random pattern is used as the texturing, the direction of the light from the textured surface can be random. In this case, the prismatic effect may not be particularly noticeable. However, where the textured surface is done using a more regular pattern, for example parallel grooves, directionality can be more amenable to control.

FIGS. 28 to 34 illustrate some patterns of grooves or etchings which may be used in embodiments of the invention.

Figure 28:
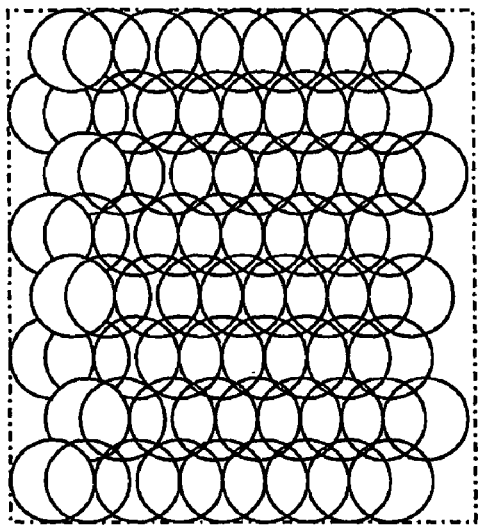
FIGS. 28 to 34 show examples of some of the patterns which can be used in embodiments of the invention.

FIG. 28 illustrates a pattern of overlapping circles. Each circle presents surfaces oriented at various angles to the light incident from the light source. Thus differing light capture patterns may be observed at different points around the circle.

Figure 29:
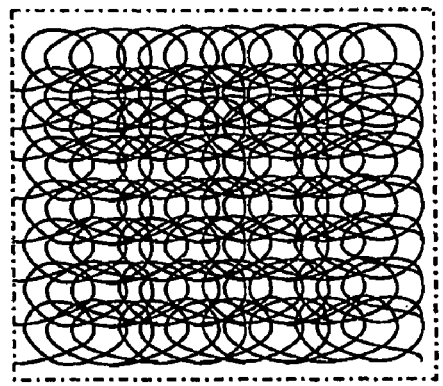

The pattern of FIG. 29 is formed by a continuous overlapping spiral grove.

Figure 30:
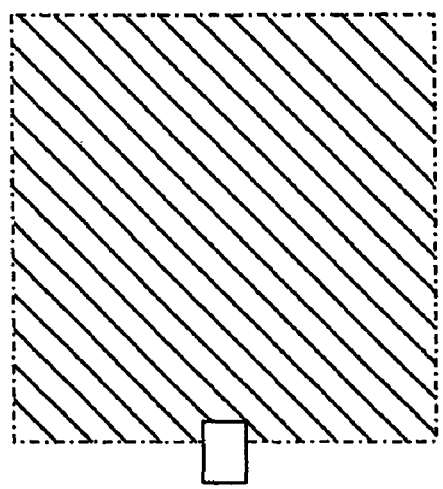

FIG. 30 represents a diagonal pattern referenced to the axis of the light from the light source.

Figure 31:
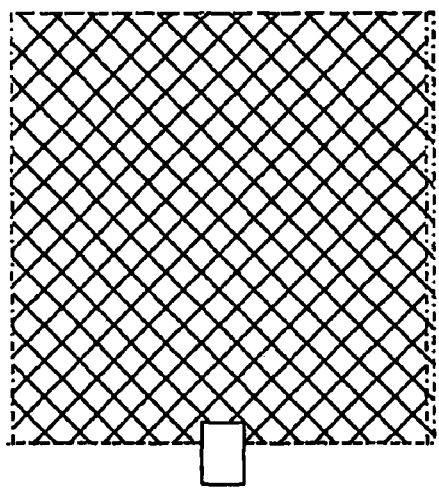

FIG. 31 shows a diamond pattern.

Figure 32:
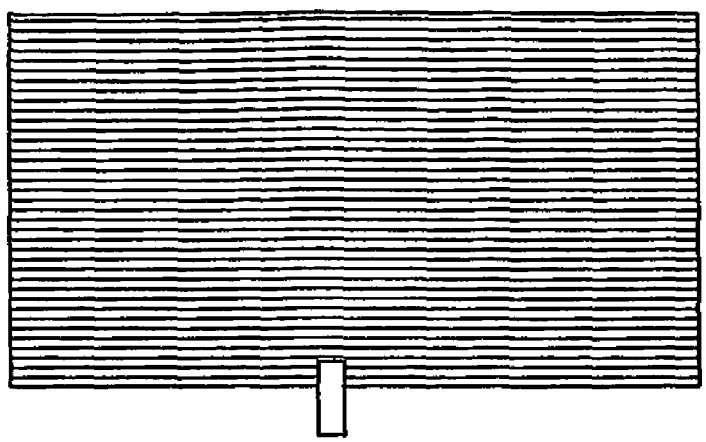

FIG. 32 illustrates a pattern of grooves substantially transverse to the light axis.

Figure 33:
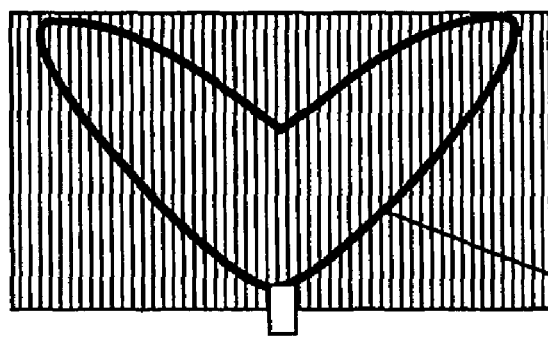

FIG. 33 illustrates a pattern substantially parallel to the light axis. As discussed above, where the light strikes a point in a groove parallel to the direction of incident light and beyond the notional critical angle, the light will be largely reflected if the groove surface is smooth. However, the angle of incident light is not parallel with the light axis except for the light which travels along the light axis. The beam spread angle provides incident light at angles which diverge from the light axis increasingly towards the edge of the beam. Thus light beyond the critical angle may be captured. This may produce, for example, a cardioid pattern as shown at 3302.

Figure 34:
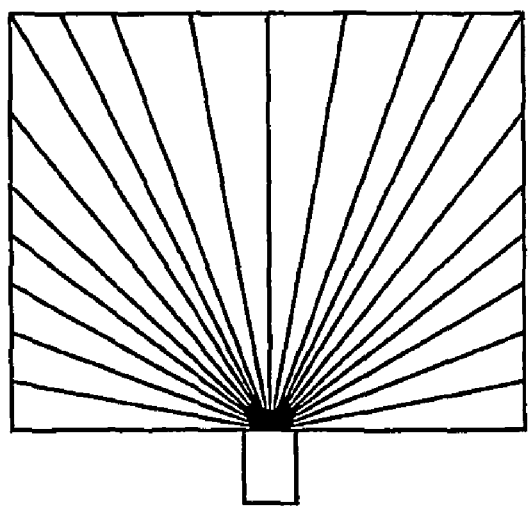

FIG. 34 illustrates a pattern radiating from a point. If the grooves are smooth sided little light will be captured beyond the notional critical angle.

Figure 36:
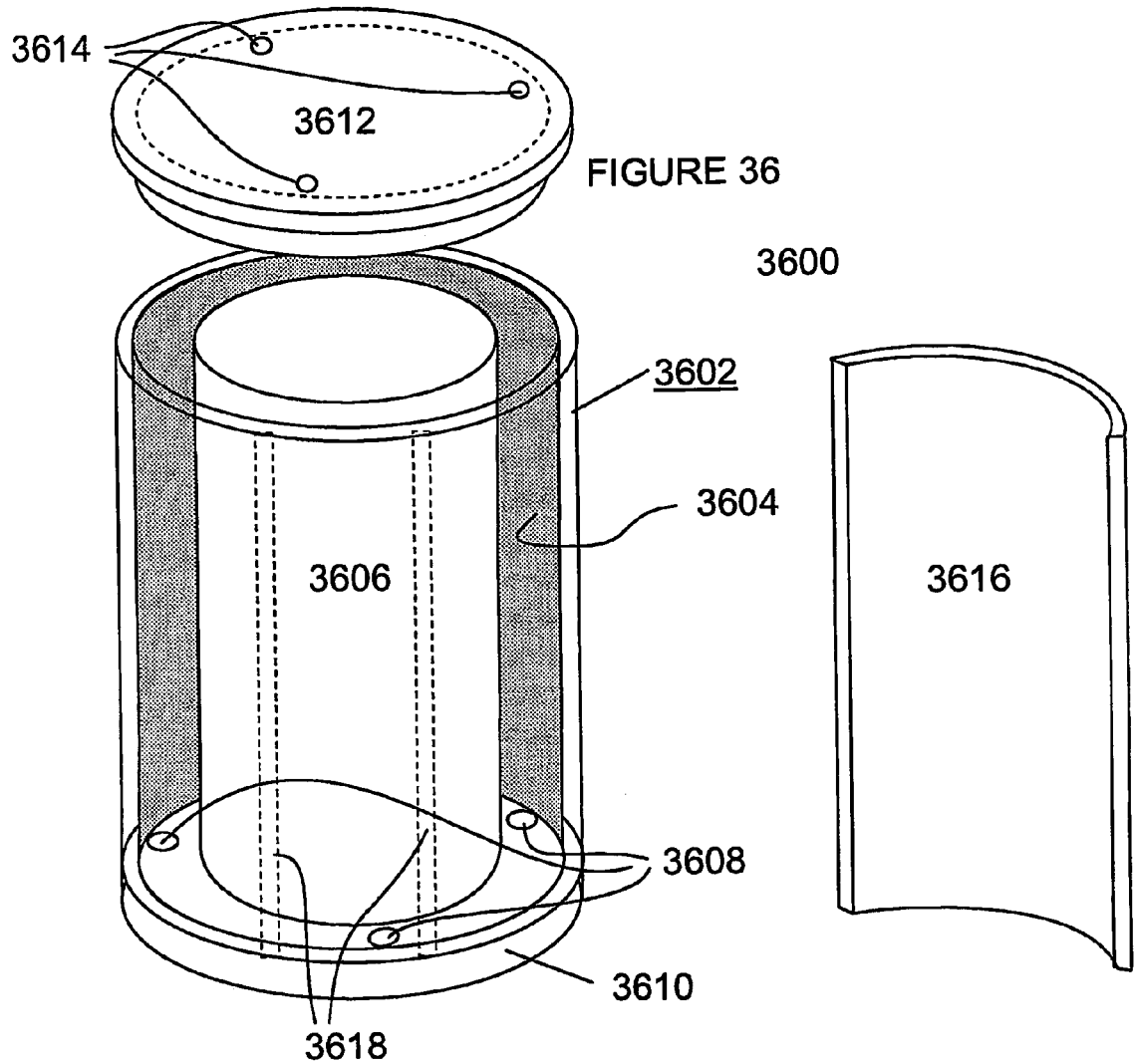
FIG. 36 shows a further embodiment of the invention.

FIG. 36 illustrates an alternative embodiment of the invention in the form of a lighting device 3600 having a tubular radiating member in the form of cylinder 3602. LEDs 3608 are located in the base 3610 and oriented to illuminate the textured inner surface 3604 of the cylinder 3602. The front portion of the texturing 3604 has been omitted from the drawing for the sake of clarity. An inner enclosure in the form of tubular member 3606 is located within the cylinder 3602. A cover or holder 3612 can also be provided to carry additional LEDs 3614 to illuminate the cylinder 3602 from the top downwards. If desired, electrical connections can be made by applying transparent conductive material such as indium tin oxide to a smooth surface of the cylinder 3602 or the enclosure 3606 so that electrical power can be supplied to the LEDs without visible wires. Illustrative transparent conductors 3618 are shown in FIG. 36. The lid 3612 can be hinged to the cylinder 3602 or detachable and suitable electrical contacting means can be provided to connect the LEDs to the battery supply. The provision of the enclosure 3606 within the lighting distributor cylinder 3602 provides a compact arrangement in which a large portion of the exterior surface of the device is used to distribute the light. This can contain batteries and electronic circuitry. This makes it possible to provide a lighting device in which a large proportion of the exterior of the device is used to transmit light. The location of the enclosure 3606 within the distributor 3602 can provide a high ratio of light output to device volume.

The lighting device can be designed so that the ratio of light emitting surface to the volume of the device is increased or maximized. Thus a lighting device in which substantially all the longitudinal surface is used to transmit light can be made. In addition, the lighting device can be designed so that the light is also emitted through the top of the device. By providing the light distributor in the form of a wrap around housing and locating light sources in appropriate positions and orientations, substantially the entire surface of the device can be a light emitting surface.

The enclosure 3606 can have a reflective surface to enhance the illumination provided by the lighting device 3600. The reflective surface can be formed by applying a reflective film to the enclosure.

The annular space between the textured surface of the cylinder 3602 and the enclosure 3606 can be air filled, or it can contain a light transmitting material. The light transmitting material can be transparent. The light transmitting material can be provided with a refractive index profile which facilitates the deflection of the light towards the outside of the of the lighting device 3600. For example, close fitting concentric tubes of first and second materials with differing refractive indices could be used, the inner concentric tube having the lower refractive index so the light is bent outwardly. An optical grade adhesive can be used between the tubes. A plurality of such concentric tubes could be used to enhance this deflection, or a tube with a radially graded refractive index could be used.

Figure 37:
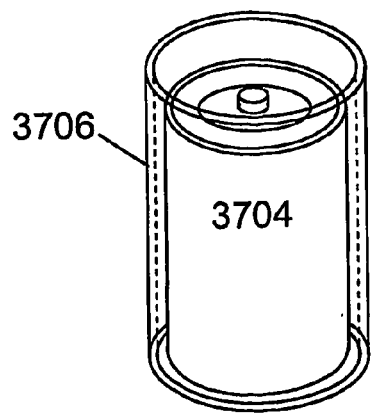
FIG. 37 illustrates a battery enclosure suitable for use with the embodiment of FIG. 36.

The enclosure 3606 is adapted to contain the batteries used to power the lighting device, as shown illustratively in FIG. 37. In FIG. 37, a battery 3704 is shown inside a battery enclosure 3706. While only a single battery is shown in FIG. 7, the enclosure 3706 can be of sufficient length to contain a stack of two or more batteries in series. Electrical connections, leads and a switch connecting the battery to the LEDs are provided to enable power to be supplied to the light sources.

In some cases, it may be desired to have only a partial area light. In such a case, a portion of the light distributor wall can be made reflective instead of being textured. As an alternative, removable reflective insert 3616 can also be used to provide the option of a full area light or a partial area light. The reflective insert 3616 can be placed inside the light distributor on one side to reflect light towards the other side. An external reflector can be used instead of the internal reflector.

The enclosure can be of any suitable shape. FIGS. 38 to 43 show various cross-sections which can be used to contain a number of batteries.

Figure 38:
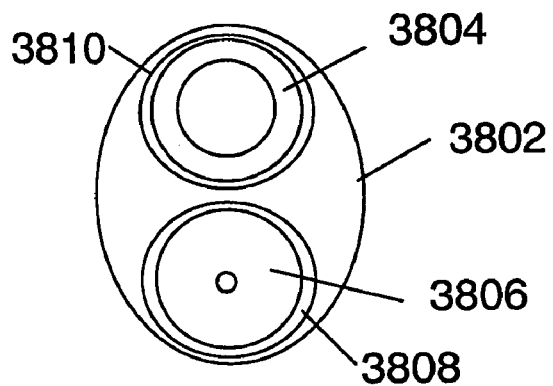
FIGS. 38 to 43 show various alternative configurations of battery enclosures.

FIG. 38 shows an elliptical enclosure 3802 adapted to hold two batteries 3804, 3806 side-by-side. The length of the enclosure can be sufficient to permit stacking of batteries. Concave portions of the cross-section can produce shadows in the output illumination if the light sources are placed to avoid illumination of the concavities. If desired, two separate battery recesses 3808, 3810 can be provided within the confines of enclosure 3802, or the enclosure 3802 can contain a single cavity to retain a pair of batteries.

Figure 39:
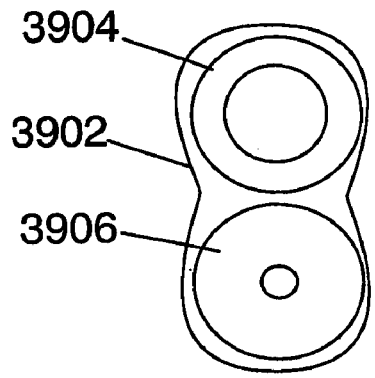

FIG. 39 shows a "figure eight" cross-sectioned enclosure 3902 adapted to hold two batteries 3904, 3906 side-by-side.

Figure 40:
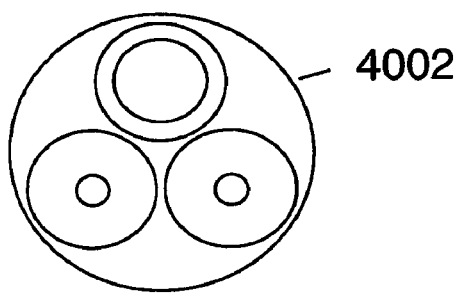

FIG. 40 shows a circular sectioned enclosure 4002 adapted to hold three batteries side-by-side.

Figure 41:
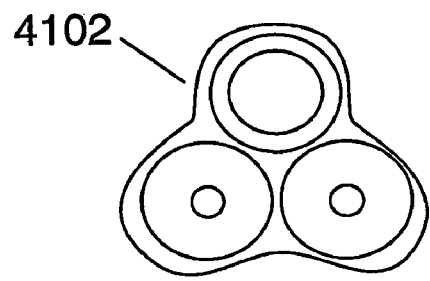

FIG. 41 shows a clover-leaf enclosure 4102 adapted to hold three batteries.

Figure 42:
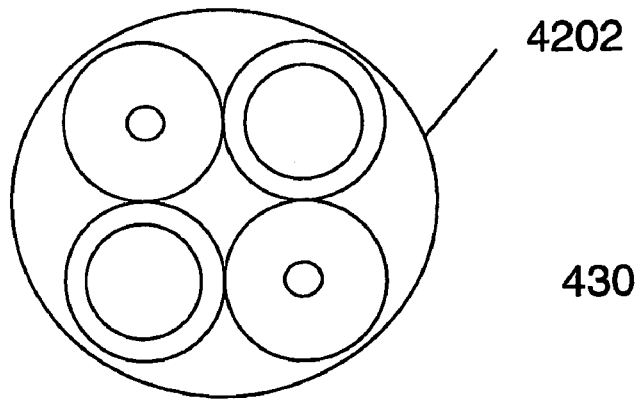

FIG. 42 shows a circular enclosure 4202 adapted to hold four batteries.

Figure 43:
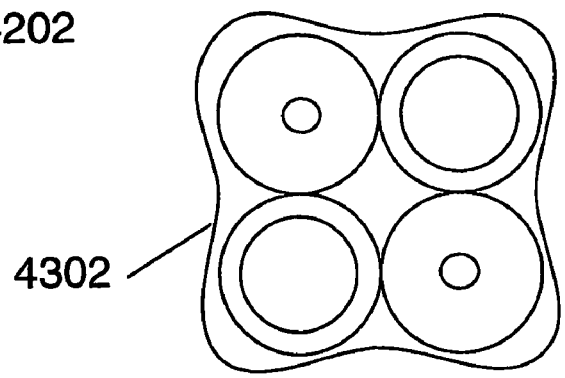

FIG. 43 shows four-leaf clover configuration 4302 adapted to hold four batteries side-by-side.

The embodiments of FIGS. 38 to 43 can contain separate battery "silos" within the enclosure.

The light distributor surrounding the various shaped enclosures can be of any suitable shape such as circular, elliptical, square, rectangular, triangular, or polygonal or it can conform to the shape of the enclosure. The light sources can be located around the perimeter to optimize the light distribution.

Figure 44:
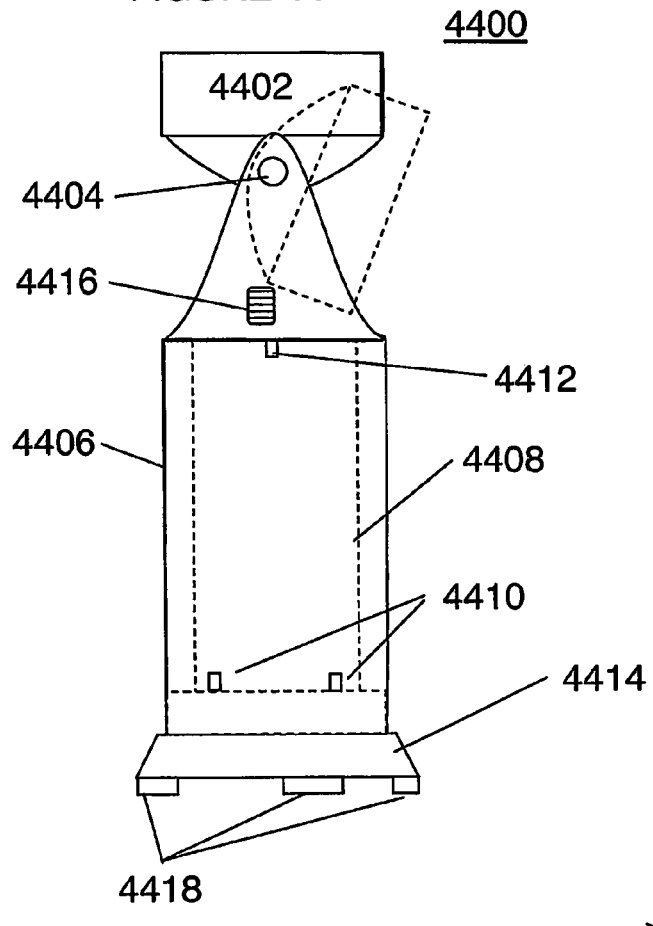
FIG. 44 shows a combined flashlight and area light according to an embodiment of the invention.

FIG. 44 shows a flashlight having a body 4406 formed as a light dispersion device and also having a directional lamp 4402.

The light dispersion device 4406 can provide "omnidirectional" or all around light. This is referred to as an area light. The light dispersion tube 4406 has a textured inner surface (not shown), and surrounds the enclosure 4408, which contains the batteries to operate the device. LEDs 4410, 4412 are located around the light dispersion device. In a preferred embodiment, a total of 6 LEDs are used.

The light device 4400 is provided with a stable base 4414 so that the light device can be oriented in an upright orientation. The base can be provided with stub legs. In one embodiment, three stub legs 4418 located equidistantly around the base are provided to enhance stability on uneven surfaces.

The enclosure 4408 can be oval shaped and can be adapted to contain four batteries in a two-by-two stack.

In one embodiment, the directional lamp can be mounted on a tilt arrangement such as pivot 4404 to permit the lamp housing to be tilted. This permits the directional lamp housing to be pointed at a preferred angle. The electrical connexions to the light source in the lamp housing 4402 can be provided via a commutator arrangement associated with the pivot arrangement 4404, for example via conductive springs and rotating contact pads.

A switch 4416 is provided to operate the lamp. This can be a multi-position switch providing two or more functions, such as directional beam, omni-directional or area light, both directional and area light, flash operation of the area light, etc., and off functions. Alternatively, independent switches can be provided to operate the area light and the directional light.

The light distributor 4406 can be partially transparent so that the enclosure 4408 can be viewed through the light distributor 4406. Thus printed matter, branding or other graphical matter applied to the enclosure 4408 can be seen through the light distributor.

Figure 45:
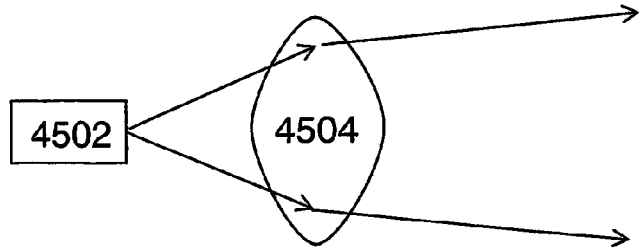
FIG. 45 shows a LED and lens arrangement implemented in an embodiment of the invention.

As shown in FIG. 45, in the case where the directional lamp is a LED 4502, a reflector may not be required because the light from a LED is usually directional. Thus this beam can be focussed through a further focussing lens 4504 to provide a desired beam width without the need for a reflector. Such an arrangement can enable the use of a more compact lamp housing. However, where an incandescent or other "omnidirectional" light source is used, a reflector can be provided.

Figure 46:
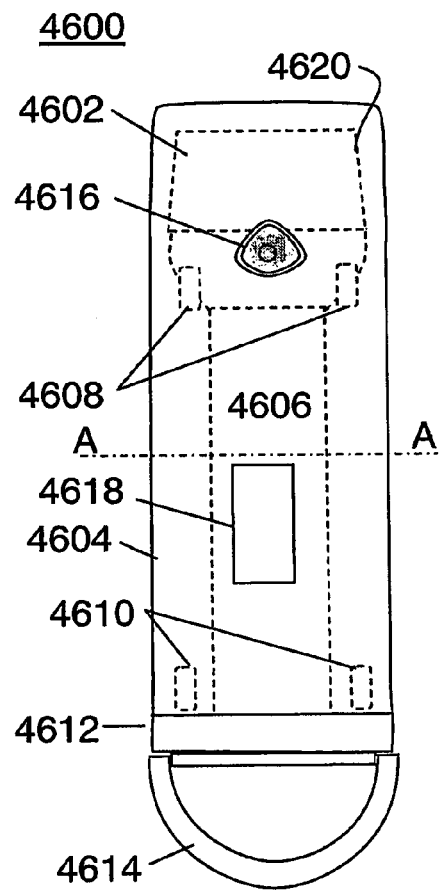
FIG. 46 shows a further combined flashlight and area light according to an embodiment of the invention.

FIG. 46 shows another flashlight embodying the invention. This flashlight has a forward facing directional lamp 4602 and an area light 4604 which surrounds an enclosure 4606. The directional lamp 4602 can be a LED spotlight. LEDs 4608, 4610 provide the light source for the area light 4604. A base 4612 can be detached to provide access to the interior of the light distribution tube 4604. This also provides access to the interior of battery enclosure 4606 so that batteries can be changed.

A switch 4616 is provided to operate the spotlight lamp housed in spotlight housing 4602. Again, the switch 4616 can be multifunctional to operate the area light function, or a separate switch can be provided for the area light.

A carry loop 4614 is pivoted to the base 4612 and is designed to fold flat into the base when not in use so the flashlight 4600 can stand upright on the base.

A translucent logo 4618 can be provided on the surface of the light distributor.

The shape of the light distributor and the enclosure, and the location of the LEDs can be arranged to produce lighting effects, such as dark lines in the light radiation pattern.

The "forward" end of the flashlight 4600 can include a wrap around lens 4620 to permit side lighting. This permits light to be emitted out the side of the wrap around lens so that, if the flashlight is placed on a table on the directional light, this can be detected and the user can turn the flashlight off to stop draining the battery. The wrap around lens 4620 can be formed in a single piece with the area light 4604.

Figure 47:
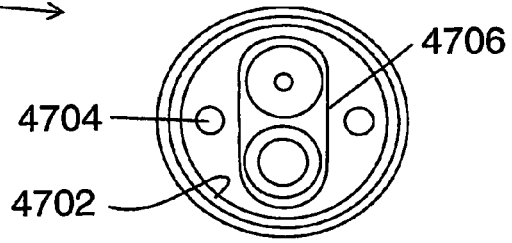
FIG. 47 shows a cross-section through the lighting device of FIG. 46.

FIG. 47 is a sectional view through line AA of FIG. 46. The enclosure 4706 contains the batteries. LEDs 4704 are located in the base between the enclosure 4706 and the light distribution cylinder 4702.

Figure 48:
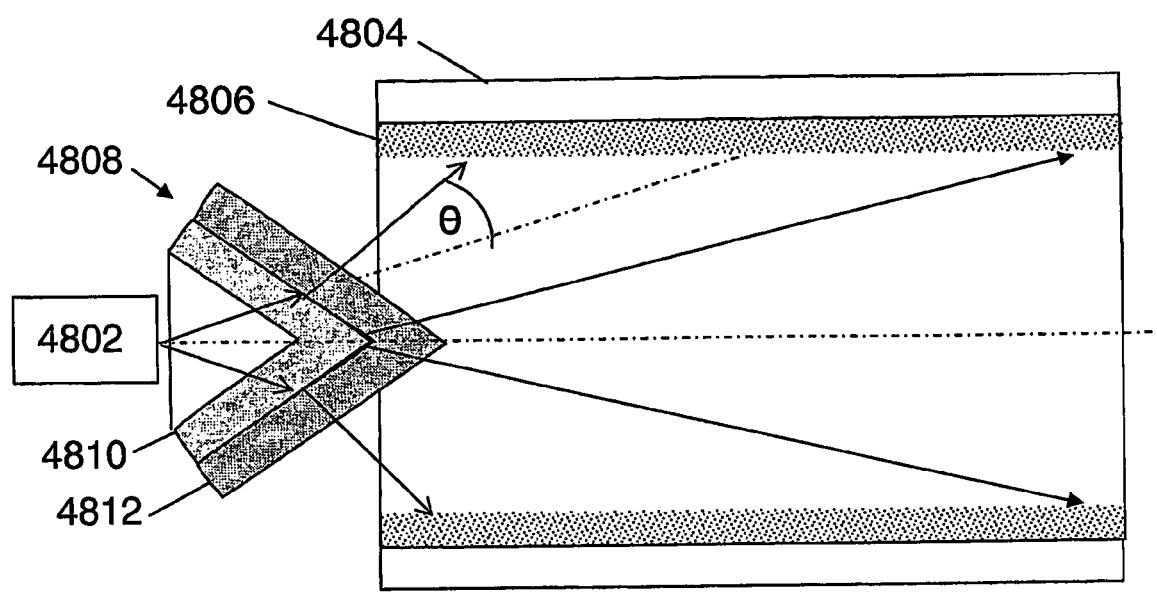
FIG. 48 shows a further embodiment of the invention using a conical light deflector to deflect light to a light dispersion tube.

FIG. 48 shows an adaptation of the arrangement of FIG. 7 for use with a tubular light dispersion member 4804. The LED 4802 provides a conical beam which is directed into the inside of a two layer conical beam deflector 4808. The beam deflector has a transparent or translucent inner layer 4810 and a transparent or translucent outer layer 4812. The outer layer has a higher refractive index than the inner layer so that the beam is deflected towards the vertical to the plane (or conic surface) of intersection of the inner and outer layers. This truncates the length of the dispersion tube 4804 required to receive the light from the LED 4802, and increases the angle between the beam and the textured surface of the dispersion tube. Thus a conical refractive index deflector can be used to direct light from the light source towards the textured surface.

Figure 49:
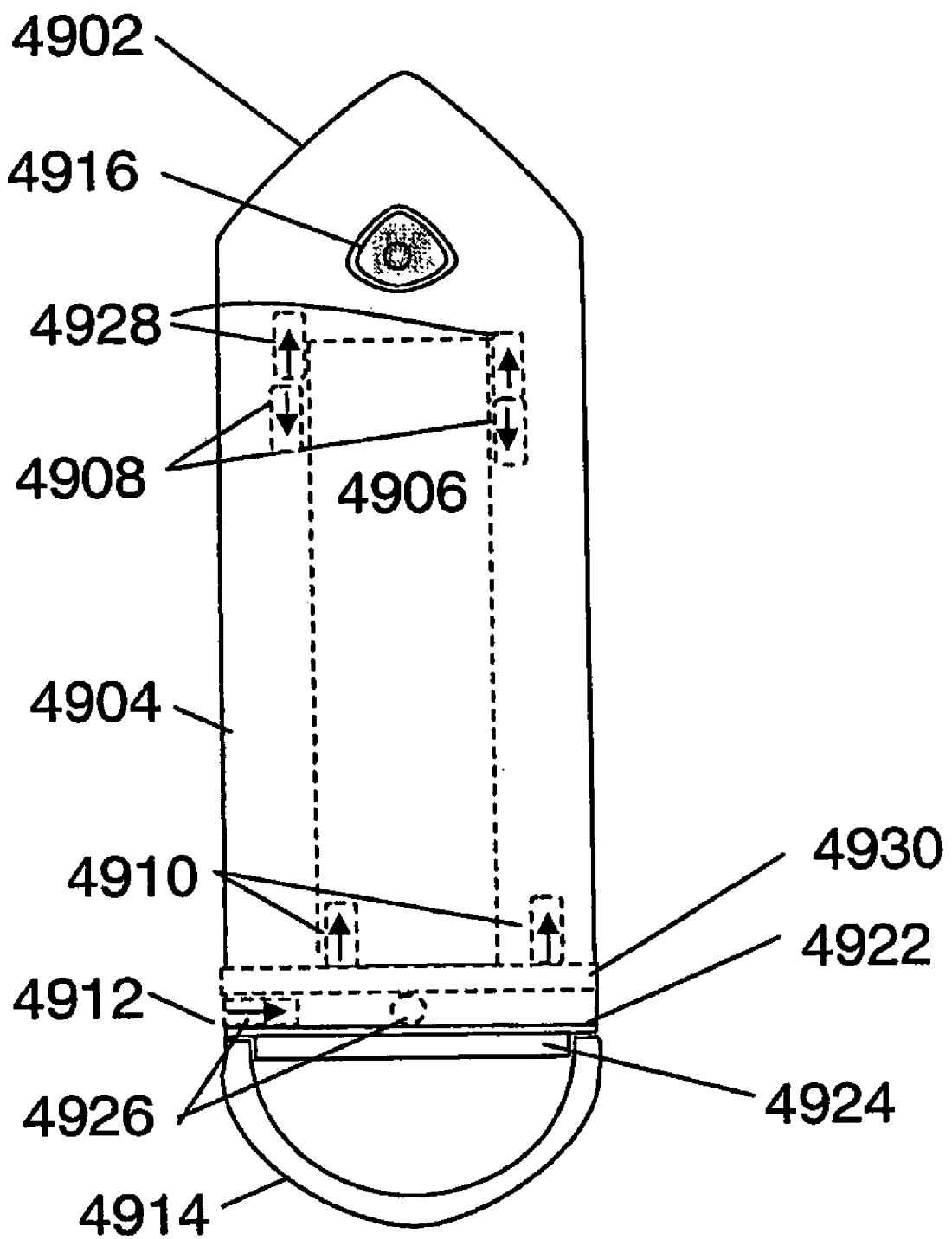
FIG. 49 shows a lighting device embodying the invention and adapted to emit light from substantially all of its exterior surface.

FIG. 49 shows a lighting device 4900 adapted to emit light from substantially the whole of its exterior surface. Substantially the whole of the housing, including the cylindrical body 4904, the conic upper end 4902, and the disc shaped base portion 4922, is formed as a light distributor with a textured inner surface. The cylindrical body 4904 and internal enclosure 4906 similar to the corresponding features of FIG. 46. However, the enclosure 4906 is mounted on a "platform" 4930 or a number of spars which serve to retain the enclosure.

Instead of having platform 4930, the portion of the enclosure 4906 can be transparent to permit light from diodes 4926 to pass through the enclosure to illuminate the base disc 4922.

The detachable base 4912 is also made as a light distributor and includes one or more LEDs 4926 which are located in a cavity below platform 4930 and aligned to illuminate the light distribution disc 4922 of the base. The base 4922 is stepped at 4924 to provide a seat for the folding handle 4914.

The base 4912 can be releasably connected to the main body 4904 by any suitable connection means such as screw fitting, releasable snap fit, bayonet connection and the like. The enclosure 4906 can be connected to the main body or to the base 4912, and is designed to permit the batteries to be changed when the base is disconnected from the main body.

LEDs 4910 and 4908 are provided to illuminate the body 4904.

LEDs 4928 are provided to illuminate the forward conic section 4902. Alternatively, the LEDS 4910 can provide illumination for the conic portion 4902.

A control switch arrangement can be provided to operate the various sets of LEDs as desired.

The other features of FIG. 49 correspond to the features of FIG. 46 which have the same last two digits. The platform 4930 can be transparent or translucent.

In addition to the "regular" patterns shown in the drawings, the surface can be roughened or patterned in any other suitable manner. A particulate containing layer in which the particles are of sufficient size to create perturbations of the surface of a size sufficient to create the desired optical effect can be used. The surface can be roughened by sand blasting. The surface layer of a panel can be selected so that, on cooling from a moulding or other manufacturing process, it forms a surface texture. A mould having a roughened surface can be used to manufacture suitable lens panels. A mould having triangular or pyramidal surface patterns can be used to make the panel lens. The texturing can include concentric rings. The texturing can include grooves in which the surface is roughened.

One method of manufacturing the light distributor is by the use of a moulding process in which a particulate material is added to a transparent or translucent plastics material which is then moulded to form the light distributor. If the particulate has a greater melting point than the matrix material, it will form a texturing effect on the surface. This will serve to produce the light capturing effect. The particles dispersed through the material will also produce light dispersion. The addition of the particulate material can be referred to as "doping". This process can result in a material in which the surface is textured and the light dispersion is effected throughout the thickness of the distributor. If desired, an outer layer of undoped transparent or translucent material can be applied to the doped transparent or translucent material.

In one embodiment, 15% silica is added to ABS (Acrylonitrile Butadiene Styrene) or acrylic or other suitable transparent material which is then moulded to form a light distributor of the required shape.

In one embodiment, the light distributor can be formed directly from a moulding process. In an alternative method, a light distributor preform can be formed and then processed to produce a light distributor. The preform may be a tube of a first diameter larger than that required for the light distributor. The preform can be drawn down form a first diameter to a second diameter. The preform can be cut into distributors of the required size.

The term batteries is used throughout this specification, but it other electricity storage devices, such as high capacitance capacitors, or "super-capacitors" can also be used.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A lighting device comprising:
a light distributor member comprising a first collector surface for receiving light and a second surface for distributing the light, wherein the first collector surface includes a textured surface having finely spaced roughened texturing formed in the light distributor member such that the textured surface is roughened to capture incident light received below a critical angle and at least part of the incident light received beyond the critical angle,
a reflector;
a light source; and
wherein the first collector surface is facing the reflector, and wherein the light distributor member, the reflector and the light source are arranged so that at least part of the light from the light source which does not impinge directly on the first collector surface is reflected by the reflector to impinge on the textured surface.

2. The lighting device of claim 1, wherein the distributor is tubular and, wherein the reflector is positioned within the tubular distributor.

3. The lighting device of claim 1, wherein the reflector is in the form of a hollow body adapted to contain one or more power sources.

4. The lighting device of claim 1, further comprising two or more light sources, wherein the light distributor member has first and second opposite ends, there being an interstice between the reflector and the light distributor member, and wherein at least one first light source is positioned near the first opposite end and oriented to transmit light into the interstice between the reflector and the light distributor member, and at least a second light source is positioned near the second opposite end and oriented to transmit light into the interstice between the reflector and the light distributor member.

5. The lighting device of claim 1, wherein the textured surface of the first collector surface and the light source are arranged so that at least part of the light from the light source impinges directly on the textured surface.

6. The lighting device of claim 1, wherein the light source is associated with a refractive index deflector to direct light from the light source towards the textured surface.

7. The lighting device of claim 1, wherein the textured surface comprises at least one of a scratched surface and an etched surface formed in the light distribution member.

8. The lighting device of claim 1, wherein the first collector surface and the second surface are formed from a single block member.

9. The lighting device of claim 1, wherein the first collector surface and the second surface are formed from a plurality of block members and the plurality of block members are coupled together to form a single composite block member.

* * * * *